(12) United States Patent
Muehlke et al.

(10) Patent No.: US 10,450,227 B2
(45) Date of Patent: Oct. 22, 2019

(54) METHOD FOR CHANGING THE GEOMETRY OF GLASS CERAMICS AND COATED GLASS CERAMIC ARTICLE PRODUCED BY SUCH METHOD

(71) Applicant: SCHOTT AG, Mainz (DE)

(72) Inventors: Oliver Muehlke, Geisenheim (DE); Martin Spier, Mainz (DE)

(73) Assignee: SCHOTT AG, Mainz (DE)

( * ) Notice: Subject to any disclaimer, the term of this patent is extended or adjusted under 35 U.S.C. 154(b) by 527 days.

(21) Appl. No.: 15/080,457

(22) Filed: Mar. 24, 2016

(65) Prior Publication Data

US 2016/0280594 A1  Sep. 29, 2016

(30) Foreign Application Priority Data

Mar. 24, 2015  (DE) .................. 10 2015 104 412

(51) Int. Cl.
*C03C 23/00* (2006.01)
*C03B 23/02* (2006.01)
(Continued)

(52) U.S. Cl.
CPC ...... *C03C 23/0025* (2013.01); *B23K 26/0006* (2013.01); *B23K 26/352* (2015.10); *B23K 26/355* (2018.08); *C03B 23/02* (2013.01); *C03B 25/025* (2013.01); *C03B 32/02* (2013.01); *C03C 3/083* (2013.01); *C03C 10/0027* (2013.01); *F24C 15/10* (2013.01); *B23K 2103/172* (2018.08); *B23K 2103/18* (2018.08); *B23K 2103/52* (2018.08)

(58) Field of Classification Search
CPC ... C03C 23/02; C03C 23/0025; C03C 25/025; C03B 32/02; B23K 26/355; B23K 26/352; F24C 15/10
See application file for complete search history.

(56) References Cited

U.S. PATENT DOCUMENTS

| 5,861,196 A | 1/1999 | Kuo et al. |
| 2001/0008715 A1 | 7/2001 | Lin et al. |

(Continued)

FOREIGN PATENT DOCUMENTS

| DE | 102004050263 | 4/2006 |
| DE | 69635850 | 10/2006 |

(Continued)

*Primary Examiner* — Laura A Auer
(74) *Attorney, Agent, or Firm* — Ohlandt, Greeley, Ruggiero & Perle, L.L.P.

(57) ABSTRACT

A method is provided for producing a raised feature on a glass ceramic element, in which a glass or glass ceramic element is irradiated with electromagnetic radiation in a local region of the surface, the radiation passes through the element and is at least partially absorbed thereby so that the element heats up in the region of the irradiated electromagnetic radiation and is heated beyond a glass transition temperature. The irradiation is terminated after heating so that the heated region cools down to the temperature of material surrounding the local region. The heating causes a change in volume of the element, which brings about a local elevation in the surface that remains after the local region cools so that a surface deformation in the form of an elevation remains after cooling.

20 Claims, 10 Drawing Sheets

(51) Int. Cl.
*C03B 32/02* (2006.01)
*C03C 3/083* (2006.01)
*C03C 10/00* (2006.01)
*B23K 26/00* (2014.01)
*B23K 26/352* (2014.01)
*C03B 25/02* (2006.01)
*F24C 15/10* (2006.01)
*B23K 103/16* (2006.01)
*B23K 103/18* (2006.01)
*B23K 103/00* (2006.01)

(56) References Cited

U.S. PATENT DOCUMENTS

| | | | |
|---|---|---|---|
| 2007/0201797 A1 | 8/2007 | Grzybowski et al. | |
| 2011/0100058 A1 | 5/2011 | Dickinson, Jr. et al. | |
| 2013/0201678 A1* | 8/2013 | Siebers | C03B 32/02 362/231 |
| 2013/0273320 A1* | 10/2013 | Bockmeyer | C03C 17/007 428/147 |
| 2013/0273324 A1* | 10/2013 | Moll | C03C 23/0025 428/161 |
| 2014/0178642 A1* | 6/2014 | Milanovska | C03C 17/007 428/143 |
| 2014/0363608 A1* | 12/2014 | Russell-Clarke | B23K 26/0066 428/66.7 |
| 2015/0174625 A1* | 6/2015 | Hart | B08B 17/065 428/141 |
| 2015/0239771 A1 | 8/2015 | Siebers et al. | |
| 2016/0031755 A1* | 2/2016 | Hoppe | B41M 5/262 428/156 |

FOREIGN PATENT DOCUMENTS

| | | | |
|---|---|---|---|
| DE | 102008050263 | 7/2010 | |
| DE | 202012012372 U1 * | 1/2013 | C03C 17/007 |
| DE | 102013110564 | 3/2015 | |
| EP | 0810586 B1 | 3/2006 | |
| WO | 2012134818 | 10/2012 | |
| WO | WO-2014170275 A2 * | 10/2014 | B41M 5/262 |

* cited by examiner

METHOD FOR CHANGING THE GEOMETRY OF GLASS CERAMICS AND COATED GLASS CERAMIC ARTICLE PRODUCED BY SUCH METHOD

CROSS REFERENCE TO RELATED APPLICATIONS

This application claims the benefit under 35 U.S.C. § 119(a) of German Patent Application No. 10 2015 104 412.9 filed Mar. 24, 2015, the entire contents of which are incorporated herein by reference.

BACKGROUND

1. Field of the Invention

The invention relates to a method for modifying the geometry of glass ceramics preferably locally, and to a glass ceramic with a local modification in geometry in the form of an elevation on the surface. The glass ceramic may comprise a layer on at least one surface.

Materials that are to be used include glass and glass ceramics (green glass state or already ceramized) that are preferably colored in the visible wavelength range (380 nm-780 nm) (and therefore usually materials that are also colored in the IR range). The modification in geometry is effected by local and time-limited exposure to electromagnetic radiation, such as e.g. laser radiation of a diode laser with a wavelength of 1 µm in CW mode and not strongly focused laser beam, preferably with a beam diameter of more than 400 µm.

2. Description of Related Art

A local change in the geometry of components made of glass ceramics is produced in three different ways according to the prior art:

First, a geometric increase can be achieved by attaching a second component to the actual component. Any joining process may be used for this purpose, such as brazing, welding and adhesive bonding. A drawback hereof is that in this case two components are required. Additionally, the joint is usually visually unattractive or forms a fracture starting edge. Moreover, it is difficult to add complex geometric elevations (circles, roundnesses, etc.) using an additional component.

Second, a local lowering in geometry can be achieved by (local) mechanical removal of material. Grinding and milling processes can be used for this purpose. The damage to the surface caused thereby may lead to a reduction in mechanical strength. Also, the modification of the surface in the abraded region (grinded or polished surface) may appear visually unattractive. Moreover, the generation of locally raised features is difficult in this way, since a lot of surrounding material would need to be removed to this end.

Third, WO 2012/134818 A1 describes a method according to which locally very limited color centers are produced in a highly transparent glass using an ultra short pulse laser in the UV range, which color centers then couple to the UV radiation better and better as a self-reinforcing effect, so that a heating effect is achieve which ultimately leads to a geometry change in the form of small, very localized elevations in the micrometer range.

A disadvantage hereof is the sophisticated ultrashort pulse laser which first has to establish the precondition so that the glass couples at all. Also, the self-reinforcing effect leads to uncontrolled heating and to an uncontrollable adjustment problem. A further disadvantage is that only glasses can be used which are sufficiently transparent in the UV range.

SUMMARY

The invention is therefore based on the object to locally generate a change in geometry of a monolithic glass ceramic component. Furthermore, it would be desirable if the glass ceramic component or the glass ceramic article produced with a local change in geometry would additionally have a layer or coating, such as a decorative layer, at least partially.

Accordingly, it is an object of the invention to generate local changes in the geometry of the glass ceramic article, which are not preventing a subsequent coating. Furthermore, it is an object of the invention to locally generate a change in the geometry of a monolithic glass ceramic component which already at least partially comprises a layer or is at least partially coated.

Attachments or mechanical processing are thus no longer necessary to produce a haptic elevation or depression which in addition to the haptic appearance also offers a certain visual perception.

It is thus possible to provide for geometric boundaries on glass ceramic components of any kind to be haptically perceptible.

The disadvantages of a joint seam, namely the visual appearance and the existence of one or more additional component edges which may lead to breakage, are eliminated.

The invention allows in particular, to generate a change in the geometry without damaging the surface; to generate a local, preferably punctiform or line-shaped elevation; to generate haptic features on glass ceramic components without significantly restricting printing options.

In order to achieve a change in geometry of a glass ceramic, according to the invention a temperature increase of the glass ceramic is effected, generally to above the glass transition temperature $T_g$, and subsequently a selective and generally very rapid cooling. After the change in geometry, a layer may be applied to the surface of the glass ceramic, at least in sections thereof, or the glass ceramic may already have a layer or coating on its surface before the change in geometry, at least in sections thereof.

Here, not only the surface, but also the volume of the material is heated to make the effect visible and to not overheat the surface. Thus, in order to achieve a local change in geometry, a local temperature increase is also achieved in the volume.

This may be effected by electromagnetic radiation in a wavelength range in which the glass or glass ceramic exhibits at least partial transmittance for the incident electromagnetic radiation.

In this way, energy is not only introduced at the surface, but throughout a part or the entire thickness (in volume), so that a homogeneous effect results which ideally does not affect the geometry of the component outside the local geometry change.

When the product of radiation density and absorption is sufficiently high, a local, shock-like increase in temperature will occur and thus a change in volume.

Specifically, the invention thus provides a method for producing a raised feature on a glass ceramic element, in which a glass element or a glass ceramic element is irradiated with electromagnetic radiation in a local region of the surface, wherein the radiation passes through the glass element or glass ceramic element and is at least partially absorbed thereby, so that the glass ceramic element heats up in the region of the irradiated electromagnetic radiation and is heated beyond the glass transition temperature; and wherein after heating the irradiation is terminated, so that the heated region cools down to the temperature of the surrounding glass or glass ceramic material, and wherein the heating results in a change in volume of the glass or glass ceramic, which brings about a local elevation in the surface, and wherein this state is frozen when the heated region cools down, so that a surface deformation in the form of an elevation remains after cooling. Surprisingly, such a change in volume is easily produced by the method in a glass ceramic that has a very low or even zero temperature expansion coefficient $\alpha_{20-600}$. Typically, the temperature expansion coefficient $\alpha_{20-600}$ of such a glass ceramic is at most $2.10^{-6}$ $K^{-1}$. In the case of a glass element, the glass element is ceramized by a heat treatment after the generation of the elevation to convert it into a glass ceramic element. Accordingly, a so-called green glass is used for the glass element, which has a composition that allows transformation into a glass ceramic. Particularly suitable for this purpose are lithium and magnesium aluminosilicate glasses.

With this method, a glass ceramic article is producible which has at least one local elevation in the surface, the smallest lateral dimension thereof having a length of at least 0.05 mm, and the local elevation having a height in a range from 0.5% to 20% of the thickness of the glass ceramic, wherein the elevation and the surrounding glass ceramic material are monolithic and have the same composition, and wherein according to a refinement of the invention the glass ceramic material below the elevation has a lower density than the material surrounding the elevation. The local elevation may have a height from 0.005 to 0.5 millimeters. The method may not only be applied to glass ceramics, but also to glasses, so that corresponding glass products are obtained. If a local elevation is initially produced in a glass element which is ceramized thereafter, differences in density may even out during ceramization, so that the density difference mentioned above is not a mandatory feature.

Surprisingly, it has been found that the glass or the glass ceramic material may at least partially comprise a layer or coating on the surface already prior to the generation of the elevation. The glass ceramic material may for instance comprise a decorative layer, at least partially. This decorative layer may be provided, for example, on a surface of the glass or glass ceramic material, preferably on the utilization side, to create a visually perceptible appearance in addition to the haptically perceptible appearance created by the local change in geometry. In this case, the glass or glass ceramic article may comprise a layer, at least partially, already before the local change in geometry.

Such a layer may preferably be produced on at least one surface of the glass or the glass ceramic material by known cost-efficient methods such as screen printing using a blade, pad printing, or inkjet printing.

According to one embodiment of the invention, it is likewise possible for the glass product produced according to the invention or the glass ceramic article produced according to the invention to be provided with a layer, at least partially, after the generation of the local elevation.

The present invention thus permits to produce at least partially coated glass products or glass ceramic articles which comprise local elevations. In a particularly advantageous embodiment, the arrangement of the local elevation and the layer may be coordinated relative to each other in such a manner that haptically perceptible and visual characteristics of the glass product or glass ceramic article complement each other to make for instance control zones or functional areas both haptically and visually easily perceptible. A functional area may be a cooking zone, for example.

Glass ceramics in the sense of the invention are in particular those materials in which the crystalline proportion predominates compared to the proportion of the residual glass phase. This preferably applies to both the proportions in volume and in weight. Preferably, the crystalline fraction is at least 60 percent by weight. Suitable for the invention are, for example, glass ceramics as known from DE 10 2004 050 263 B4. In these glass ceramics the proportion of the high quartz mixed crystal phase is preferably in a range from 60 wt % to 70 wt %. Other glass ceramics suitable for the invention may comprise even higher weight and/or volume fractions of the crystalline phase. Depending on the choice of the radiation source and the form of energy input, the region of the geometry change may have a punctiform, line-shaped or 2-dimensional shape.

Punctiform irradiation allows for many options in the design of the elevations. "Punctiform" in this context of course means that the irradiated region still occupies a certain small area. Suitable dimensions are in particular in a range of up to twice the thickness of the glass or glass ceramic element.

According to one embodiment of the method, the electromagnetic radiation is thus focused to an area with the outer dimensions of between 10% and 200% of the glass thickness. Preferably, this area has a circular or elliptical shape, but may also be produced with the shape of a line in individual cases, by means of suitable optical devices such as fixed optics, in which case the line width should not be greater than twice the thickness, preferably not greater than the thickness of the glass or glass ceramic element. The geometry and length of the line may be any and may be open or closed. Thus, it is possible by means of appropriate fixed optics, to produce for example lines, arcs, rings, or other geometric elements without moving the laser or the workpiece.

With a punctiform input of energy, the region of modified geometry may take any form when moving the radiation source or the component. In this way it is possible to produce for example letters, symbols or triangles, quadrangles or any other geometric shape in form of elevations on the surface of the component.

The dimensions of the change in geometry may reach diameters of 0.05 mm or more, preferably from 0.5 mm to 3 mm for punctiform elevations, and line widths of 0.05 mm or more, preferably from 0.5 mm to 3 mm for line-shaped elevations with any length of the line.

Thus, according to one embodiment of the invention, the punctiform area onto which the electromagnetic radiation is irradiated is moved over the surface of the glass or glass ceramic element so as to produce an elevation having a surface area that is larger than the surface area of the punctiform area.

Radiation sources that may be used include UV radiation sources, IR radiators with tungsten filaments, laser sources, such as for example diode lasers, fiber lasers or other radiation sources, whose electromagnetic radiation can penetrate the glass ceramic material at least partially.

The choice of the appropriate radiation source depends on the absorption capacity of the glass ceramic material to be treated in the wavelength range of the radiation source.

Most preferably, the heating is performed using an infrared laser, preferably a diode laser, as the radiation source.

For ceramized CERAN glass ceramics, or more generally lithium aluminosilicate glass ceramics, for example, diode lasers of a wavelength in the near infrared range, for example in a range of about 1 μm are suitable. At this wavelength, a glass ceramic plate of 4 mm thickness has a transmittance between 50% and 80%, so that sufficient radiation will pass through the entire thickness of the plate in order to heat it homogeneously across the thickness of the plate at the location of energy input.

With sufficiently high power, a temperature of more than 700° C. can be obtained within a few seconds at the location of energy input.

Thus, in order to generate a local elevation, a temperature increase is also caused locally in the volume. This is achieved by electromagnetic radiation in a range of wavelengths in which the glass or glass ceramic exhibits a partial transmittance for the incident electromagnetic radiation. In this way, energy is not only introduced at the surface but across the entire thickness or in a partial volume of the glass ceramic element.

If the product of radiation density and absorption is sufficiently high, a (local) shock-like increase in temperature will occur, and thus a change in volume. If this product is too large, only the surface will be heated and therefore overheated and the effect in the volume will not be strong enough. If the product is too small, heating will occur too slowly and either the effect will not occur at all or it will not be locally clearly limited, that is it will be smeared.

Therefore, according to one embodiment of the invention, the radiation density or power density of the electromagnetic radiation and/or the absorption coefficient k of the glass ceramic material is selected such that the product P of power density and absorption coefficient k is at least $P=0.35$ $(W/mm^3)*(1/mm)$. To avoid heating to occur only at the surface, according to yet another embodiment of the invention, the absorption coefficient should not be more than $2/d$, wherein d is the thickness of the glass or glass ceramic element.

Preferably, the electromagnetic radiation is irradiated onto the area to be heated of the glass or glass ceramic element at an average power density of at least 2.5 $W/mm^2$, in order to achieve sufficiently fast heating.

To obtain elevations with steep slopes that are haptically well discernible, it is advantageous if the heating occurs very quickly so as to produce a steep temperature gradient in the glass or glass ceramic material in the direction perpendicular to the direction of irradiation. This temperature gradient then results in a correspondingly sharp boundary between the area of lower density below the elevation and the surrounding material, which in turn leads to localized deformations. Therefore, it is preferred that the heating is effected with a temperature rise of at least 20 K per second. For initial glasses for glass ceramics (green glasses) the rapid temperature increase is moreover advantageous in order to rapidly pass through the temperature range of nucleation and thus to counteract premature ceramization. For typical green glasses such as especially lithium aluminosilicate glasses, this temperature range of nucleation is in a range from 700° C. to 800° C. Generally, it is preferred to pass through this temperature range in less than 20 seconds during heating.

In order to support coating of the glass element or glass ceramic material after generation of the elevation, it may also be advantageous to form the slopes not too steep, so that a rather smooth geometric profile of the elevation is achieved.

A smooth geometric profile of the elevation is therefore characterized by smooth radius transitions, low total height of the elevation, or low inclinations. It has been found particularly advantageous, if a ratio of the height h1 of an elevation to the total width b1, which includes the width of the elevation b2 and the width of possible depressions around the elevation, is in a range of less than 0.2, preferably of less than 0.1. Furthermore it is advantageous, if the ratio of the depth h2 of a depression surrounding the elevation to the height h1 of the elevation is less than 0.5. Finally, it is advantageous if the ratio of the width of the elevation b2 to the total width b1 is between 0.1 and 1. Accordingly, the following relationships are favorable: $h1/b1<0.2$; more preferably $h1/b1<0.1$; $h2/h1<0.5$; and $1>b2/b1>0.1$.

The height and depth are measured starting from the respective surface in each case.

In this way, a standard decoration method such as screen printing may most advantageously be applied to coat a glass product produced according to the invention or a glass ceramic article produced according to the invention. It has been found that the blade used for this purpose can be moved very well over the produced elevations. Hereby, thin layers with a layer thickness of about 0.1 mm or less can be applied particularly easily on the glass product or the glass ceramic article.

According to another embodiment, the glass or glass ceramic material has a layer or a coating on its surface, at least in sections thereof, already before the raised feature is produced. Preferably, this is the same surface on which the raised feature is generated. The method according to the invention allows to generate the raised feature in such cases as well. In this case, it is advantageous if the heat-affected zone has a small lateral extension. In particular, a sufficient distance to the layer should be ensured, to not overheat the layer which otherwise might be damaged. Therefore, the heat-affected zone required for generating the raised feature should preferably be kept free of layers or coatings. The invention has the advantage that this heat-affected zone can be kept very narrow, so that a discontinuity of the layer in the region of the heat-affected zone is hardly noticeable.

Generally, it is moreover advantageous if the glass or glass ceramic element is preheated. In this way, treatment time can be shortened and thus a steep temperature gradient can be achieved. Preheating is in particular advantageous when producing local elevations in glass elements to reduce mechanical stresses after cooling. Generally, it is preferred that prior to irradiating the glass element or glass ceramic element with electromagnetic radiation in a local region of the surface for generating the surface deformation in the form of an elevation, the glass element or glass ceramic element is preheated to a temperature of at least 300° C., preferably at least 400° C.

Once the plate has been cooled to room temperature, the volume at the location of the energy input will be higher than before the radiation treatment.

Optionally, a thermal post treatment step may be performed after cooling. With such a post treatment step tensile stresses induced by the previous heating can be relieved. Also, fine-tuning of the produced transmission is possible by a step of thermal post treatment.

Possible variations of the thermal post treatment are: a second heating step using electromagnetic radiation, preferably using a laser whereby the volume is heated up to and held at a stress relieve temperature; and thermal reheating and stress relieve in a conventional furnace, for example in a lehr.

Generally for glass or glass ceramic plates, the local elevation is preferably produced on the utilization side in order to generate haptically discernible features. In case of glass or glass ceramic elements with a knob pattern on one side, local elevations are therefore preferably added on the smooth side.

The area of energy input may be determined both by the shape of irradiated energy, and by additionally masking the plate to be treated such that portions of the glass or glass ceramic element that are not intended to be modified are effectively protected from impingement of radiation. Optics which allow beam-shaping of a round beam spot into a rectangular or linear beam area and thus enable simultaneous irradiation of a defined local geometric area, can also be used advantageously for the method of the invention.

The advantage of this method over the prior art is the fact that only one monolithic component is required without any adjustments to the composition, joining steps or machining. Moreover, the monolithic component may have a layer or coating at least partially. The method is very fast (in the order of seconds), highly flexible and extremely well adaptable to a wide range of geometries and applications.

Even three-dimensionally shaped parts can be treated. The treatment of the component according to the invention may be carried out both before and after the ceramization step in case of a glass ceramic.

The invention may be of interest for applications such as: cooking zone markings or boundaries of control elements on glass ceramic cooktops, for example for so-called "vulnerable people", inter alia, to provide safety-related information on cooktops by haptic features; applying a 1-dimensional (bar) or 2-dimensional (dot matrix) bar code on the surface of the product (e.g. of a vial/syringe) for permanent labeling; applying a fill quantity scale or fill level line or other mark on the glass wall of the product (e.g. vials, containers, tubes); applying visual design elements to sheet glasses (e.g. architectural glazing), such as company logos or geometric elements (arrows as a direction sign, escape routes); permanent forgery-proof marking of products by a raised logo on the surface of the glass; applying pictograms, letters, geometric items in touch applications for mobile phone covers or other electronic devices; generating haptic features for visually impaired people, for example on a cooktop; reducing the contact area between the bottom of a pot and a glass ceramic cooktop thereby creating thermal insulation, especially for induction cooktops; generating haptic features in depressions, in particular in concave or depressed control elements; creating zones on the surface, preferably on the utilization side, which have both haptically and visually discernible characteristics.

BRIEF DESCRIPTION OF THE DRAWINGS

The invention will now be described in more detail by way of exemplary embodiments and with reference to the drawings. In the drawings, the same reference numerals designate the same or equivalent elements.

DETAILED DESCRIPTION

Figure 1:
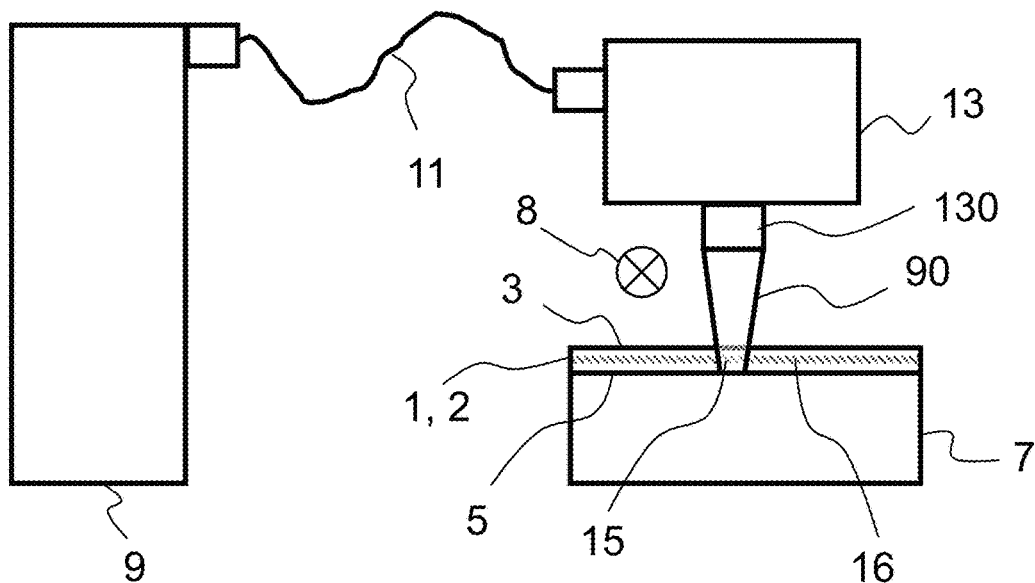
FIG. 1 shows an arrangement for performing the method according to the invention.

With reference to FIG. 1 an exemplary embodiment of the method of the invention will be explained. A glass ceramic element 1, here in the form of a ceramized glass ceramic plate (a lithium aluminosilicate glass ceramic with high quartz mixed crystals as the main crystal phase) with a size of 50 mm×50 mm and a thickness of 4 mm is placed on a slip-cast silicon dioxide ceramic support 7 of 100 mm×100 mm and of a thickness of 30 mm, with a face 5 facing the silicon dioxide ceramic support 7. Silicon dioxide ceramic support 7 and the glass ceramic plate are kept at room temperature. Above this arrangement, a laser scanner 13 with a focusing optics 130 with a focal length of 250 mm is installed in a manner so that the laser beam 90 is incident perpendicular to the surface of the glass ceramic plate. In the focus the laser beam has a diameter of 1.5 mm. The arrangement of QUARZAL® support 7 and the glass ceramic plate is placed in the focal plane. Laser radiation of a wavelength between 900 nm and 1100 nm is supplied to laser scanner 13 via a fiber 11. In this example, a diode laser is used as the laser source 9, for example from company Laserline, which provides an adjustable output power between 0 W and 3000 W.

The laser scanner is now programmed, for example so as to trace a circle with a diameter of 40 mm at a speed of 1 m/s. Once the laser source 9 has been enabled, the glass ceramic plate is locally irradiated with an output power of 1000 W for the duration of 30 seconds. Then, the laser 9 is turned off and the glass ceramic plate cools down freely in air. In the region of irradiation, a raised circle can be clearly seen and felt on the glass ceramic plate. The rest of the plate remains geometrically unchanged. This applies both to smoothness and to local thickness variations.

Without being limited to the embodiment described above, a rapid cooling is preferred. This is favorable in order to freeze the effect of the volume change. According to one embodiment of the invention it is therefore contemplated that after having been heated, the glass ceramic is cooled at a cooling rate of at least 1 K per second, preferably at least 5 K per second, more preferably at least 10 K per second, at least within a temperature range between the maximum temperature and 100 K below the maximum temperature.

Alternatively, a glass element 2 can be used instead of glass ceramic element 1. This glass element 2 is then ceramized when the raised feature has been produced.

The glass element or the glass ceramic element may have a layer or coating thereon already before the raised feature is produced. This may for example be a decorative layer, which is applied on a surface of glass product 2 or of glass ceramic element 1, preferably on the respective utilization side. This layer may for instance be produced particularly cost-efficiently using known processes such as screen printing, pad printing, or ink jet printing.

The small lateral extension of the heat-affected zone permits to extend the layer close to the area to be reshaped. However, a sufficient distance of the heat-affected zone to the layer should be ensured to not overheat the layer which could otherwise be damaged. Therefore, the heat-affected zone required for generating the raised feature should preferably be kept free of layers or coatings.

In order to support coating of the glass element or glass ceramic material once the elevation has been produced, it may also be advantageous to form the slopes not too steep, so that a rather smooth geometric profile of the elevation is achieved.

A smooth geometric profile of the elevation is therefore distinguished by smooth radius transitions, low total height of the elevation, or low inclinations. In this way, a standard decoration method such as screen printing may most advantageously be applied to coat a glass product produced according to the invention or a glass ceramic article produced according to the invention. It has been found that the blade used for this purpose can be moved very well over the produced elevations. This allows to particularly easily apply thin layers with a layer thickness of about 0.1 mm, 0.01 mm, 0.005 mm or less on the glass product or the glass ceramic article.

According to a preferred embodiment of the inventive method, the glass or glass ceramic element may be preheated prior to the irradiation of electromagnetic radiation, preferably prior to the laser irradiation as shown in the example of FIG. 1. This preheating is advantageous in order to rapidly reach the temperature desired for generating the raised feature. Especially when reshaping a glass element 2, the resultant advantage is that the temperature range of nucleation is crossed quickly, so that premature ceramization is suppressed. Moreover, mechanical stresses resulting after cooling are in particular minimized in this way, because the temperature increase required for reshaping is reduced. Preheating is preferably accomplished up to a temperature of at least 300° C. In the example shown in FIG. 1, a heating source 8 is provided for preheating the substrate. For example a radiation source may also be used as a heating source which, however, irradiates and heats the glass or glass ceramic element not locally but over a large area, for preheating purposes. According to an exemplary embodiment, a glass element 2 or a glass ceramic element 1 is preheated to a temperature in a range from 400° C. to 500° C. prior to be further locally heated by means of a laser, which leads to a deformation of the surface in form of an elevation.

Figure 2:
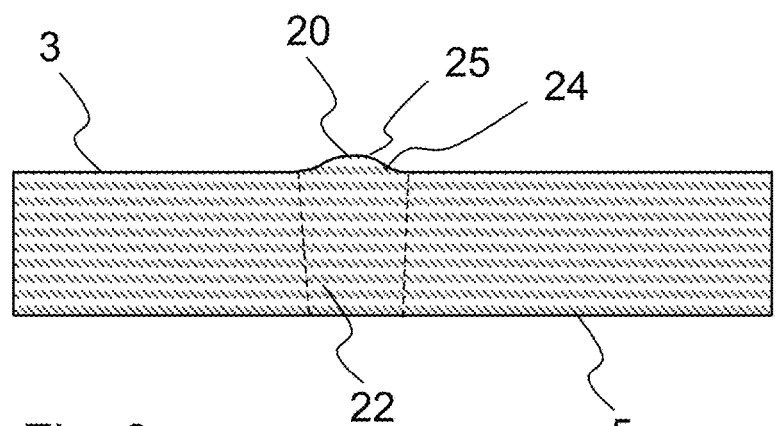
FIG. 2 is a schematic cross-sectional view through a glass ceramic element of the invention.

FIG. 2 shows a cross-sectional view through a glass ceramic element 1 of the invention. By rapid heating using laser 9 or another radiation source equivalent in terms of output power and absorption in the glass ceramic material, a local protuberance or elevation 20, or a raised feature was generated on a face 3. The volume change frozen during cooling causes a region 22 of reduced density compared to the surrounding glass ceramic material, which extends into the glass ceramic material in the region of elevation 20. This region 22 may even extend to a face 5 opposite face 3 with the elevation 20, as in the example shown in FIG. 2.

Elevations produced by the method of the invention, or local elevations 20, have a characteristic profile with rounded peripheries. Specifically, as schematically shown in FIG. 2, inter alia, the periphery of elevation 20 has a concave curvature 24 that merges into a convex curvature 25 towards the center of the elevation.

If a glass element is used instead of a glass ceramic element, and ceramization is carried out only after reshaping the surface and generating elevation 20, differences in density may even out during ceramization, at least partially. In this case, region 22 will not be present, or at least its density will not be significantly different from that of the surrounding glass ceramic material.

Figure 3:
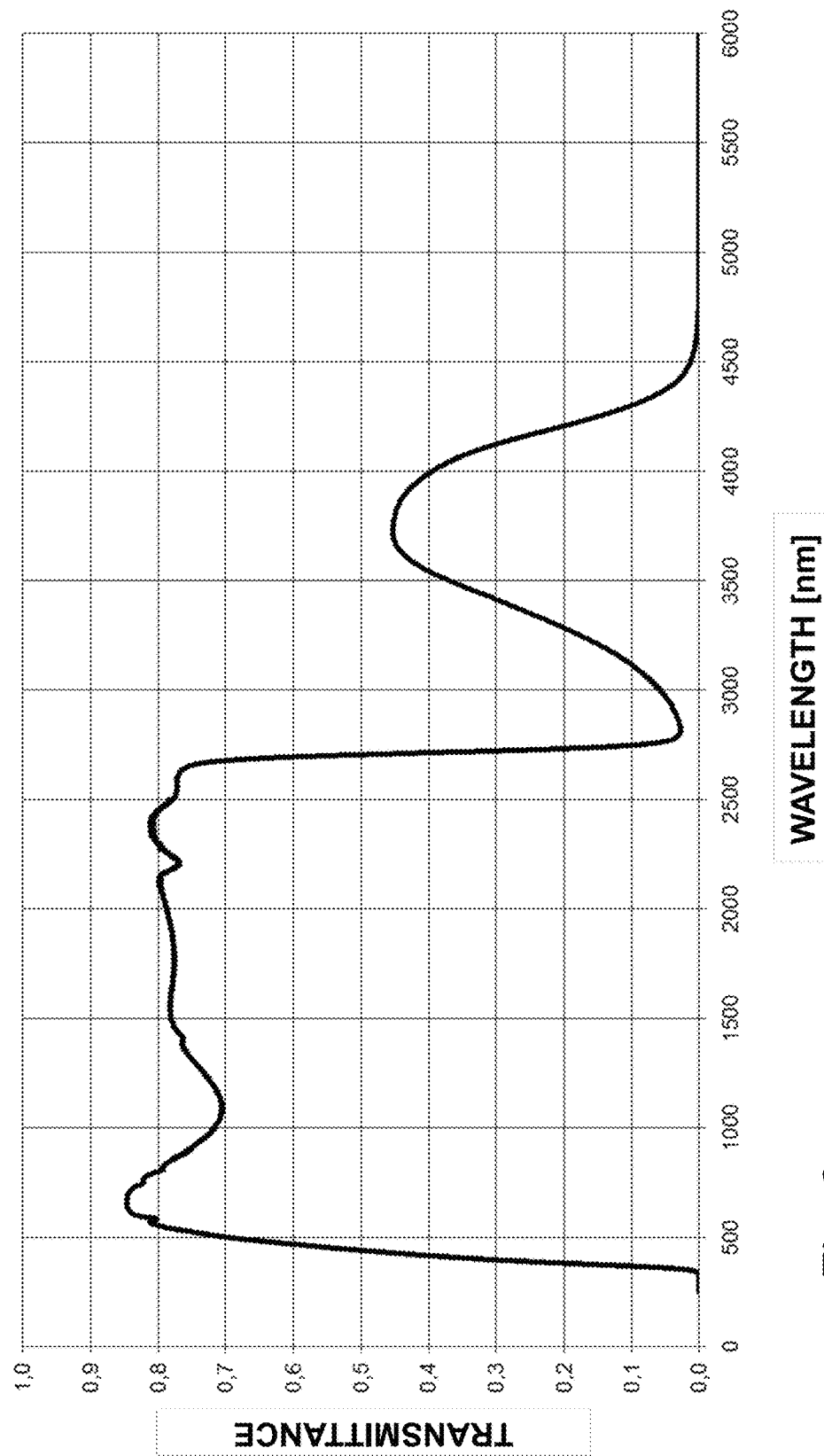
FIG. 3 is a graph of spectral transmittance of a green glass for producing a glass ceramic.

FIG. 3 shows a graph of spectral transmittance of a so-called green glass. This green glass can be transformed into a lithium aluminosilicate glass ceramic by ceramization. The glass element, for which the transmittance measurement was performed, has a thickness of 4 millimeters. In order for the radiation to penetrate glass element 2 and thereby be at least partially absorbed, wavelengths in a range from 500 nanometers to 2700 nanometers are particularly suitable. Wavelengths in a range from 3200 nanometers to 4200 nanometers are also possible, since the glass exhibits rather high transmittance in this spectral range as well, enabling penetration of the radiation.

In volume-colored glass ceramic elements 1, surprisingly, a local change in color may be achieved in addition to the modification of the surface. Specifically, light transmittance can be increased locally in the region of elevation 20. Such a color change in volume-colored materials was demonstrated with a glass ceramic colored by coloring metal ions, in particular by vanadium oxide.

Therefore, according to one embodiment of the invention, without being limited to the specific illustrated exemplary embodiments, it is contemplated that the glass ceramic of the glass ceramic article is volume-colored by coloring metal ions, and that in the region of the local elevation the coloring of the glass ceramic is different from that of a second region adjacent to the local elevation 20, so that in the region of the local elevation the absorption coefficient is smaller than the absorption coefficient of the second region so that in the visible spectral range integral light transmission of the local elevation 20 is higher than integral light transmission of the second region.

In the context of the invention, a volume-colored glass ceramic refers to a material in which the color centers or coloring ions are distributed throughout the material. That is to say they are not locally concentrated in the form of coloring crystallites as is the case with pigments. Like a dye, the coloring ions or color centers are dissolved in the glass or the glass ceramic, while pigments are dispersed in the material. Accordingly, volume-coloring has an effect on transmission, but not on scattering, whereas pigments themselves represent scattering particles. However, it is not intended to exclude that possibly additional pigments are present.

The method of the invention is very suitable for locally attenuating the coloration of a glass ceramic article that is volume-colored by vanadium oxide. Accordingly in this case, by the heating, transmission in the visible spectral range between 380 nanometers and 780 nanometers is increased in the local region. Therefore, according to one embodiment of the invention a glass ceramic element volume-colored by vanadium oxide is provided, in which in the region treated according to the invention, that is where the local elevation is produced, integral light transmission in the visible spectral range is increased compared to an adjacent second, non-treated region.

In this way, windows of higher transmission may easily be produced in an otherwise dark appearing glass ceramic cooktop, for example. Below such a window, a display may then be mounted, and the light from the display will be visible to the viewer through the local elevation. A window, as a particularly preferred form of a brightened region produced by the method according to the invention, refers to a region which is surrounded along at least three edges thereof or at least 50% of its periphery by adjacent non-brightened second regions. Preferably, the brightened first region is completely surrounded by second regions, or non-brightened glass ceramic material.

Typically, the temperature at which the increase in transmission occurs is above the temperature at which the viscosity of the glass ceramic is at $10^{14}$ dPa·s. If heating is terminated before the softening point is reached at which the viscosity has a value of $10^{7.6}$ dPa·s, brightening may be achieved without modifications in shape. Accordingly, depending on the heating procedure, it is possible to produce local elevations and additionally merely brightened regions.

In order to achieve a sufficiently dark coloration, the glass ceramic preferably comprises at least 0.005 percent by weight of vanadium oxide, preferably at least 0.01 percent by weight of vanadium oxide.

According to one embodiment of the invention, the glass ceramic is colored with coloring ions in this case, preferably with vanadium oxide, so that in the visible spectral range integral light transmission of the glass ceramic of the second region is not more than 5%, preferably not more than 2.5%.

If the local elevation is already generated in the green glass, i.e. in a glass element 2, local brightening typically will not result since the dark color is only produced during ceramization. However, if desired, local brightening may again be achieved by an additional heating step.

Figure 4:
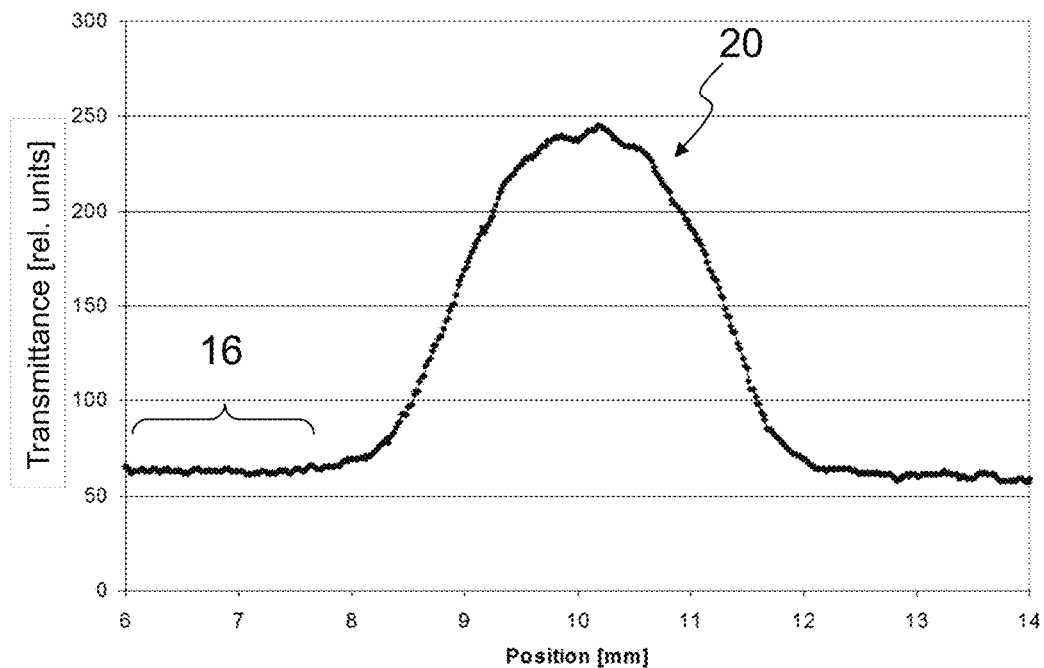
FIG. 4 is a transmittance profile of a volume-colored glass ceramic plate along a position coordinate perpendicular to the longitudinal extension of a local elevation.

FIG. 4 shows an exemplary transmittance profile of such a glass ceramic sample volume-colored by vanadium oxide, in which a local elevation 20 in form of a ridge or bulge was generated using the method of the invention. The direction of the position coordinate extends perpendicular to the longitudinal extension of the ridge. The profile of local elevation 20 is also apparent from the discoloration caused by the heating of the glass ceramic, and therefore the increase in transmittance compared to an adjacent second region next to the elevation. When seeing through the glass ceramic sample, the region of the local elevation accordingly appears much lighter. It is also possible here to only create a discoloration or brightening without an elevation 20 of the invention, if a lower temperature increase is chosen during heating. If a brightening is produced in a region without a volume modification, the product P of power density and absorption coefficient k may be kept smaller, other than outlined above. A value of at least P=0.25 (W/mm$^3$)*(1/mm) is preferred for the product.

With this method, a volume-colored monolithic glass ceramic article is obtained, for example in the form of a cooktop, which comprises a first region in which the coloration differs from that of a second, adjacent region, so that the absorption coefficient of the first region is smaller than the absorption coefficient of a second, adjacent region 16, so that integral light transmission in the visible spectral range of the first region is higher than integral light transmission of the second, adjacent region, while light scattering in the glass ceramic of the first region typically differs from light scattering in the glass ceramic of the second region by not more than 20 percentage points, preferably by not more than 10 percentage points, more preferably by not more than 5 percentage points, and most preferably by not more than 1 percentage point. Thus, light scattering in the glass ceramic of the first region is substantially the same as light scattering in the second, adjacent region with non-modified light transmission. The upper limit of light scattering differing by not more than 20 percentage points also applies to the case that light scattering in the first region is lower than in the second region. Given this marginal increase in light scattering, if any, there will be no visible effect. Light scattering is the fraction of total incident intensity minus the directly transmitted light, Fresnel reflection, and absorption. The increase in scattering given in percentage points refers to the proportion of scattered light during transmission of a light beam. If, for example, the proportion of scattered light intensity in the second region is 3% of the total intensity, an increase by 5 percentage points in the first region then means a proportion of scattered light intensity in the first region of 3%+5%=8%. The terms transmission, scattering, absorption, and remission as used in the context of the invention are in conformity to the definitions according to DIN 5036-1 and can be determined with the measurement rules according to ISO 15368. The mentioned first region additionally comprises local elevation 20 of the invention. It is possible to produce one or more additional first regions without elevations. The effect of marginally changed light scattering with the values indicated above may also result in a glass ceramic not volume-colored or in a glass ceramic without a color change caused by the treatment according to the invention.

Integral light transmission refers to light transmittance averaged over a range of wavelengths, for example the visible spectral range from 380 to 780 nanometers wavelength. Transmittance is light transmission as a function of wavelength expressed as a percentage value. In the context of the present description, the term light transmission refers to integral light transmission, unless transmittance is mentioned. The change in transmission may range from an increase by 0.1 percentage points to an increase by 50 percentage points in addition to the initial transmittance. Preferably, in particular in case of dark colored glass ceramics, transmittance in the visible spectral range of the first region 20 is increased by at least a factor of 2 as compared to the second, adjacent region 16. In the example shown in FIG. 4, transmittance in the region of the local elevation is increased by more than a factor of three compared to the non-brightened region 16 adjacent to elevation 20.

Another feature of this embodiment of the invention is the fact that the incident wavelength need not be the wavelength at which the effect is achieved, that is the wavelength at which the modification of transmission occurs. Thus, it is possible according to the present invention to irradiate in the infrared wavelength range at a wavelength of 1 μm, for example, because the glass or glass ceramic has an absorption band in this wavelength range. However, the resulting effect may occur in the visible range between 380 nm and 780 nm, for example, and a modification of transmission may be caused at one or more wavelengths within this range due to physico-chemical reactions of the elements and compounds included in the glass.

When introducing a local elevation 20 and/or a brightening in case of a volume-colored glass ceramic, only minor structural changes will result in the modified or treated region.

Figure 5:
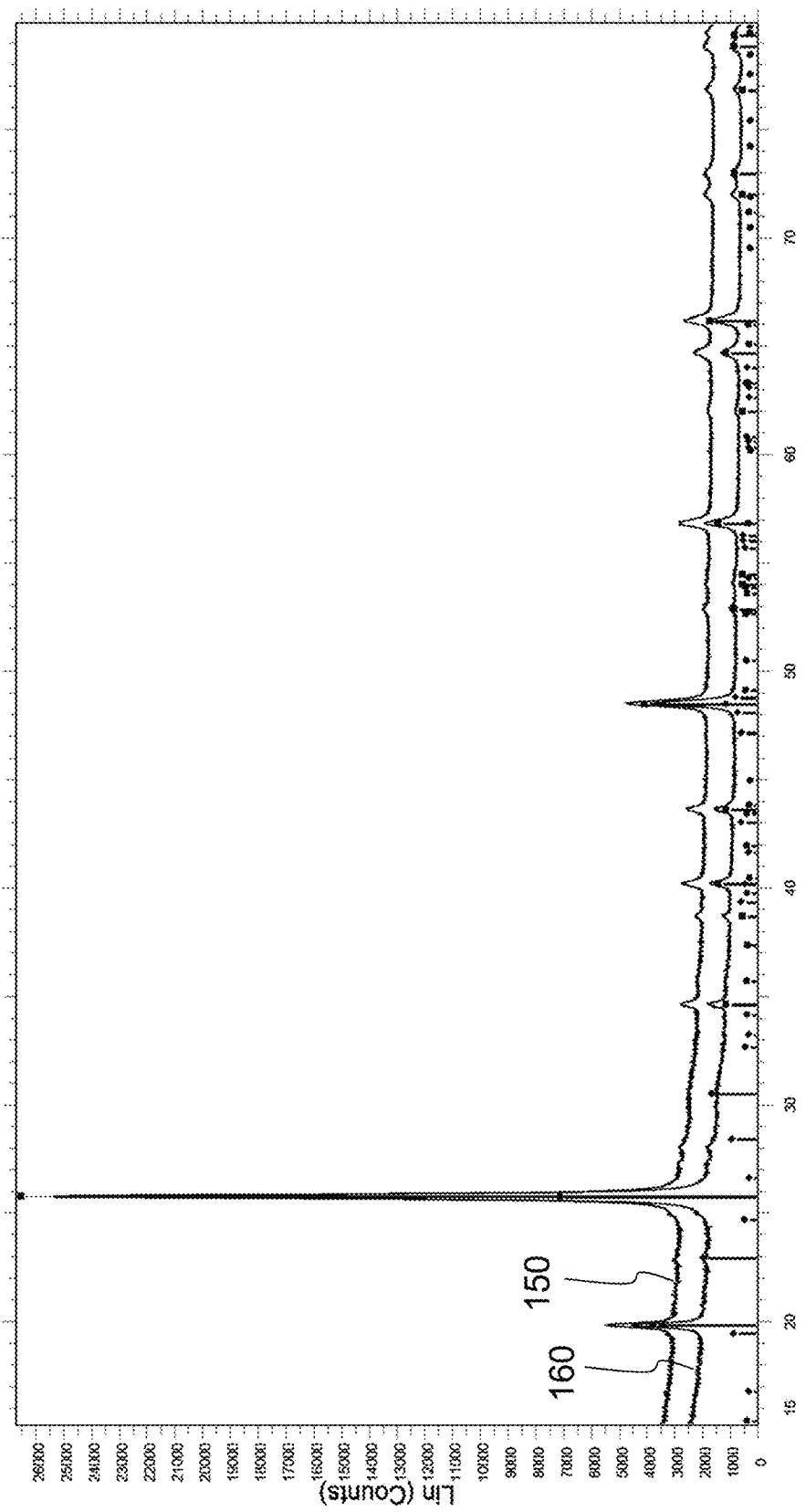
FIG. 5 shows X-ray diffraction spectra of a brightened region and a non-modified region of a volume-colored glass ceramic.

For illustration purposes, FIG. 5 shows X-ray diffraction spectra of a monolithic glass ceramic element as obtained by the method explained with reference to FIG. 1. The tested glass ceramic is a lithium aluminosilicate glass ceramic volume-colored by vanadium oxide, as is used for cooktops, for example. X-ray diffraction was used to compare the crystal phases, the content of crystal phases, and the crystallite size of a region 15 brightened by laser irradiation with those of adjacent, non-brightened regions 16. Additionally, the relative intensities of different crystal phases are marked with a diamond, a square, or a circle. Squares indicate X-ray diffraction peaks of high-quartz mixed crystal (HQMK), diamonds indicate X-ray diffraction peaks of lithium aluminosilicate or keatite mixed crystal (KMK, $LiAlSi_3O_8$), and circles indicate X-ray diffraction peaks of zirconium titanate ($ZrTiO_4$) which was also detected in the glass ceramic. Curve 150 represents the X-ray diffraction spectrum of the brightened region, i.e. region treated according to the invention, and curve 160 represents the X-ray diffraction spectrum of an adjacent, non-modified region 16. As can be seen, the curves are virtually identical, except for the different offset for purposes of illustration. The only result of a closer analysis of the intensities of the X-ray diffraction peaks is a very small increase in the content of the keatite mixed crystal phase. The results are summarized in the table below:

| Sample | Crystallite size [nm] [+/−5%] | | HQMK phase content [+/−10%] | | KMK phase content [+/−10%] | |
| --- | --- | --- | --- | --- | --- | --- |
| | HQMK | KMK | uncorrected | corrected | uncorrected | corrected |
| brightened region | 49 | not determinable | 54 | 66 | 3 | 3 |
| non-modified region | 48 | not determinable | 55 | 67 | 1 | 1 |

For absorption corrections in the columns designated "corrected", the chemical composition of the glass ceramic and an assumed density of 2.5 $g/cm^3$ were used.

According to the table above and to FIG. 5, the content of the high-quartz mixed crystal phase does not change within the measurement error range. Only the content of keatite mixed crystal shows a change which does not have any significant impact on the microstructure of the glass ceramic because of the low proportion of this crystal phase. That means, even if treated and non-treated regions of a glass ceramic element do not exhibit any significant structural differences, according to one embodiment a region of an aluminosilicate glass ceramic treated according to the invention, in particular of a lithium aluminosilicate glass ceramic, can be distinguished by an increased content of keatite mixed crystal as compared to an adjacent non-treated region.

Changes in the crystal phases and/or their proportions may have an influence on light scattering. When light scattering in the material changes, this also leads to a change in remission when illuminating the treated region. As demonstrated in the above example, treated and non-treated regions are virtually identical in their morphology, in particular with respect to the existing crystal phases. Therefore, in an inventive product remission does not change either, or only marginally, when comparing a treated and a non-treated region. Therefore, according to a further embodiment, without limitation to the exemplary embodiment described above, remission for visible light in the first region differs from remission of the second region by not more than 20 percentage points, preferably by not more than 10 percentage points, more preferably by not more than 5 percentage points. Light scattering in the first zone likewise increases only marginally, if at all, by less than 5 percentage points. As already stated above, generally the composition of the glass ceramic is preferably chosen such that the crystalline proportion, or the crystal phase content predominates compared to the proportion of the residual glass phase. According to one embodiment of the invention, the proportion of high quartz mixed crystal is at most 70 percent by weight, preferably between 60 and 70 percent by weight.

A glass ceramic having these properties can be produced based on oxides with a composition in wt % as follows:

| | |
| --- | --- |
| $Li_2O$ | 3.0-4.2; |
| $Na_2O + K_2O$ | 0.2-1.5; |
| MgO | 0-1.5; |
| CaO + SrO + BaO | 0-4; |
| ZnO | 0-2; |
| $B_2O_3$ | 0-2; |
| $Al_2O_3$ | 19-23; |
| $SiO_2$ | 60-69; |
| $TiO_2$ | 2.5-4; |
| $ZrO_2$ | 0.5-2; |
| $P_2O_5$ | 0-3; |
| $SnO_2$ | 0.1-<0.6; |

-continued

| | |
| --- | --- |
| $V_2O_5$ | 0.01-0.06; and |
| $Fe_2O_3$ | 0.03-0.2 |

Preferably one or both of the following secondary conditions also hold: $1<Fe_2O_3/V_2O_5<8$; and $TiO_2+ZrO_2+SnO_2$: 3.8-6.

The X-ray diffraction measurements were acquired on a sample in which only a brightening was accomplished without a volume change. In the method of the invention which comprises local deformation, a more pronounced increase of the keatite phase content is to be expected due to the greater heating. In a sample in which a considerably protruding local elevation was generated, a slight increase in scattering can even be observed visually in the region of the elevation. As light scattering is generally caused by keatite mixed crystals, according to one embodiment of the invention a higher proportion of keatite mixed crystals in the glass ceramic material in and below elevation 20 in LAS glass ceramics is a characteristic feature of a glass ceramic article produced according to the invention. According to this embodiment of the invention, therefore, a glass ceramic article made of aluminosilicate glass ceramic, preferably lithium aluminosilicate glass ceramic is provided, in which the glass ceramic material of local elevation 20 has a higher content of keatite mixed crystals than a second region 16 adjacent to the local elevation.

In the embodiment with a glass ceramic volume-colored by vanadium oxide and with an increase in transmittance achieved at the same time with the local elevation, a particularly advantageous resulting effect is an increase in transmittance that reaches into the blue spectral range. This makes it possible to use the brightened region even for blue light emitting optical displays that shine through the glass ceramic.

Figure 6:
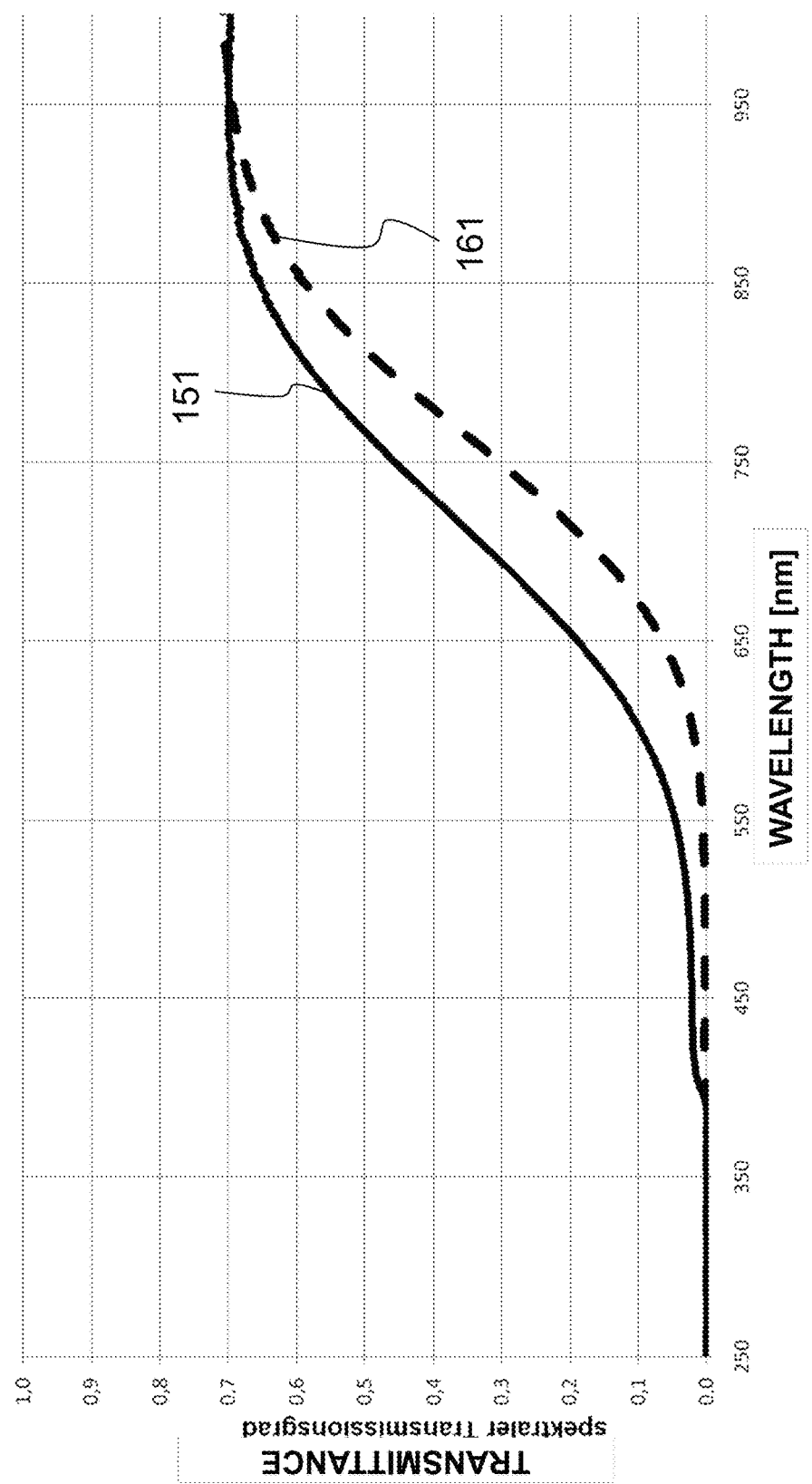
FIG. 6 is a graph of spectral transmittance of a treated and a non-treated region of a glass ceramic plate.

To illustrate this, FIG. 6 shows spectral transmittances of a glass ceramic plate of 4 mm thickness, volume-colored by vanadium oxide and treated according to the invention, as a function of wavelength. Curve 151 in FIG. 6 represents spectral transmittance of a region treated by a laser, curve 161 represents spectral transmittance of an adjacent, non-treated region 16. From the two curves it can be seen that in the treated region 15 spectral transmittance is significantly increased over the entire spectral range between 420 nanometers and 780 nanometers. This is advantageous when it is desired to improve transparency without significantly modifying the tint, in order to selectively make specific regions of the glass ceramic cooktop more transparent for luminous or non-luminous display elements, or, more generally, to provide windows, in particular viewing windows. Therefore, according to one embodiment of the invention and without limitation to the specific exemplary embodiment, spectral transmittance of the first region is higher than that of an adjacent, second region within the entire spectral range between 420 nanometers and 780 nanometers.

What is also remarkable about the spectral transmittance of FIG. 6 is that transmittance in the blue and green spectral range increases more strongly, in relative terms, than that in the red range. For example, at 500 nanometers transmittance increases from 0.0028 to 0.027, that is by a factor of more than nine. At 600 nanometers, the factor is lower, namely 4.7 in this case. It is just this what is particularly favorable to improve display capability for blue and/or green display elements or for color displays in volume-colored glass ceramics, especially glass ceramics colored by vanadium oxide. Therefore, according to yet another embodiment of the invention, the ratio of spectral transmittances of the treated region to the adjacent non-treated region is greater at a wavelength in a range from 400 to 500 nanometers than at a wavelength in a range from 600 to 800 nanometers. The spectral transmittance was measured on a sample in which only brightening, but no elevation was generated. Since brightening occurs in the same or even a greater extent when a raised feature or elevation is produced according to the invention by local exposure to electromagnetic radiation and heating above the glass transition temperature, the exemplary embodiment of FIG. 6 also applies to a glass ceramic article of the invention.

Below, the colors are listed as measured in the treated and non-treated regions 15, 16 in transillumination of the glass ceramic plate of 4 mm thickness, for different color models (xyY, Lab, Luv) and various standard light sources:

|   | region 16 | region 15 |
|---|---|---|
| Standard light type A | | |
| x | 0.6307 | 0.5782 |
| y | 0.3480 | 0.3805 |
| Y | 1.7 | 7.6 |

-continued

|   | region 16 | region 15 |
|---|---|---|
| Standard light type D65 | | |
| x | 0.5550 | 0.4773 |
| y | 0.3540 | 0.3752 |
| Y | 1.2 | 6.2 |
| Ra | −25.6 | 22.0 |
| Standard light type C | | |
| x | 0.5545 | 0.4763 |
| y | 0.3495 | 0.3685 |
| Y | 1.2 | 6.3 |
| Yellowness I. | 174.0 | 120.8 |
| Standard light type A | | |
| L* | 13.6 | 33.2 |
| a* | 23.2 | 24.2 |
| b* | 19.1 | 27.7 |
| C* | 30.0 | 36.8 |
| Standard light type D65 | | |
| L* | 10.6 | 30.0 |
| a* | 20.8 | 20.2 |
| b* | 13.8 | 22.9 |
| C* | 25.0 | 30.5 |
| Standard light type C | | |
| L* | 10.8 | 30.2 |
| a* | 20.1 | 19.2 |
| b* | 14.1 | 23.2 |
| C* | 24.5 | 30.1 |
| Standard light type A | | |
| L* | 13.6 | 33.2 |
| u* | 30.3 | 45.3 |
| v* | 0.9 | 4.3 |
| Standard light type D65 | | |
| L* | 10.6 | 30.0 |
| u* | 22.6 | 36.6 |
| v* | 7.0 | 18.5 |
| Standard light type C | | |
| L* | 10.8 | 30.2 |
| u* | 22.9 | 36.7 |
| v* | 7.8 | 20.3 |

In the Lab, xyY, and Luv color models, parameters L and Y, respectively, denote the brightness. When using standard light type C or standard light type D65, the parameter Y in the xyY color model corresponds to transmission $\tau_{vis}$ in the visible spectral range, and from a comparison of the Y values the increase in transmission can be determined. From the values given above it can be seen that transmission in the visible spectral range is increased by at least a factor of 2.5. Generally, it should be noted here that the transmission additionally depends on the refractive index and on the thickness of the transilluminated glass ceramic cooktop. However, it can be generally stated that according to one embodiment of the invention the transmittance in the visible spectral range between 380 and 780 nanometers is increased by at least a factor of 2.5, based on a thickness of 4 millimeters.

The coloring by vanadium oxide, $V_2O_5$, as was the case in the exemplary embodiments of FIGS. 4 and 6 discussed above, has also been known from DE 10 2008 050 263 B4, according to which the coloring mechanism is a complex process. According to this document, a prerequisite for converting the vanadium oxide into the coloring state is a redox reaction. In the crystallizable initial glass, the $V_2O_5$ still colors relatively weakly and produces a slightly greenish tint. During ceramization the redox reaction occurs, the vanadium is reduced and the redox partner is oxidized.

The refining agent functions as the primary redox partner, which was shown by Mössbauer investigations of Sb- and Sn-refined compositions. During ceramization, a part of the $Sb^{3+}$ or $Sn^{2+}$ in the initial glass is converted to the higher oxidation state $Sb^{5+}$ and $Sn^{4+}$, respectively. It was assumed that the vanadium is incorporated into the seed crystal in the reduced oxidation state as $V^{4+}$ or $V^{3+}$ and intensively colors therein due to electron charge transfer reactions. Also, as another redox partner, $TiO_2$ may intensify the coloring by vanadium oxide. Besides the type and quantity of the redox partners in the initial glass, the redox state that is adjusted in the glass for the melt also has an influence, according to DE 10 2008 050 263 B4. A low oxygen partial pressure, i.e. a melt adjusted to a reducing state, for example due to high melting temperatures, increases the coloring effect of the vanadium oxide.

However, it is also possible that the reduced $V^{4+}$ or $V^{3+}$ is not or not exclusively incorporated into the seed crystals, but possibly also into another structural environment, such as the high-quartz mixed crystal, or into clusters.

With the invention, this coloration is locally modified by irradiation of high-energy radiation and heating of the glass ceramic.

This may be associated with an impact on the coloring charge transfer process. Since the hypothetical electron transfer between donor and acceptor centers during charge transfer is significant for absorption, it can be assumed that the applied high-energy radiation and the heating cause a modification of the structure of these centers. This structural modification reduces the frequency/likelihood of electron transfers and thus absorption.

Because of the sensitivity with which the coloring by vanadium reacts to partial pressure of oxygen and to redox processes during ceramizing, competing valency changes might be relevant in this context. That is to say, the radiation in combination with the heating may possibly remove electrons from the donor or acceptor centers thereby passivating them for the charge transfer process.

This hypothesis is supported by the observation that the reduced coloration can be reversed by thermal treatment. The thermodynamically more stable structural state of the centers can be restored. This re-increases the frequency of coloring charge transfers.

Figure 7:
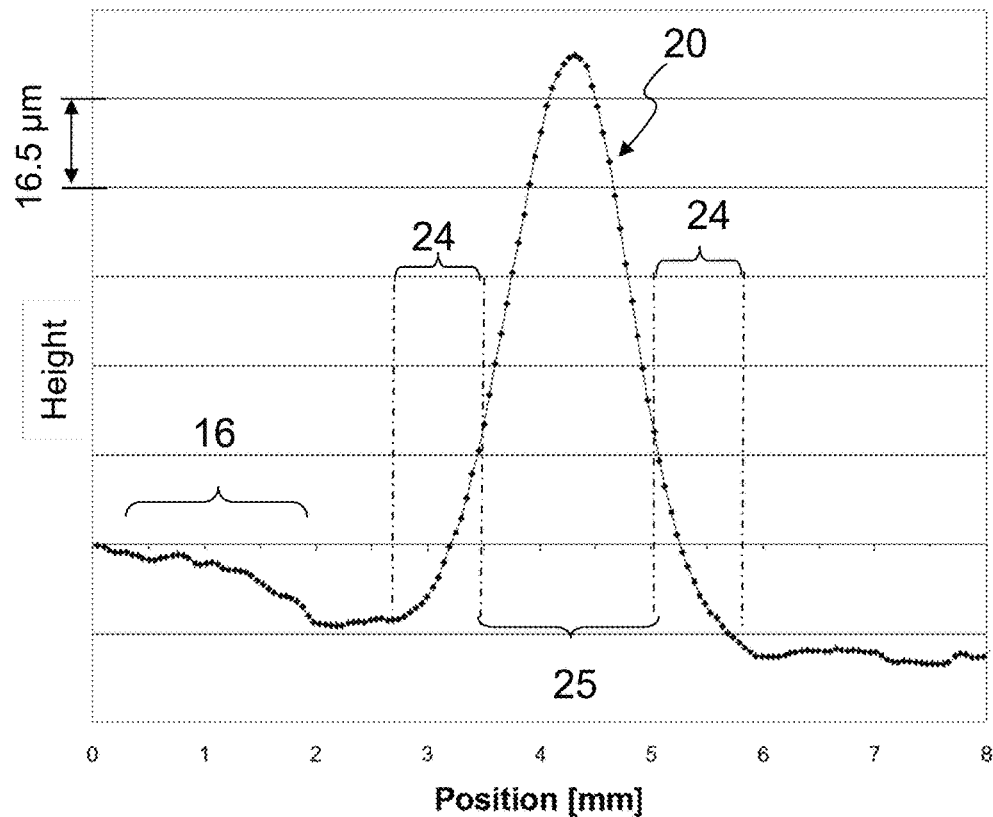
FIG. 7 is a height profile of an elevation.

FIG. 7 shows an optically measured height profile of the elevation 20 that was also used to measure the transmittance profile shown in FIG. 4. In the illustration it should be noted that very different scales were used on the abscissa and the ordinate to illustrate the shape of the local elevation. The scale lines on the ordinate axis represent a spacing of about 16.5 µm. Also, clearly distinguishable is a concave curvature 24 at the periphery of elevation 20, that merges into a convex curvature 25 towards the center thereof.

When comparing FIG. 4 and FIG. 7 it becomes apparent that the full width at half maximum of the transmittance profile is larger than the full width at half maximum of elevation 20. This is the case because the brightening or, more generally, the color change in the volume-colored glass ceramic already occurs at lower temperatures than the formation of the elevation. Therefore, brightening may even occur where no volume change is caused, due to the temperature field during irradiation. Therefore, according to one embodiment of the invention, without limitation to the specific exemplary embodiment shown in FIG. 4 and FIG. 7, the full width at half maximum of the transmittance profile of integral light transmission in the region of local elevation 20 is greater than the full width at half maximum of the local elevation 20 itself.

Furthermore, the height of local elevation 20 is in a range from 0.025 to 0.8 millimeters, preferably not more than 0.3 millimeters. Specifically, the height of the example shown in FIG. 7 is approximately 100 micrometers. Elevations of this height are haptically well discernible, which is no longer the case for heights that are too low. On the other hand, excessively large heights of more than 0.3 millimeters cause stresses in the material due to the volume change, which might adversely affect the strength of the glass ceramic article. Particularly preferred heights of elevation 20 are in a range from 50 µm to 150 µm. However, especially in case of punctiform elevations the mentioned height of 0.8 mm may be produced without significant loss in strength. In case the elevation is produced in a glass element 2 which is subsequently ceramized, existing stresses will be relieved anyway during ceramization. So it is quite possible to achieve the height of 0.8 mm of the elevation as mentioned above.

Figure 8:
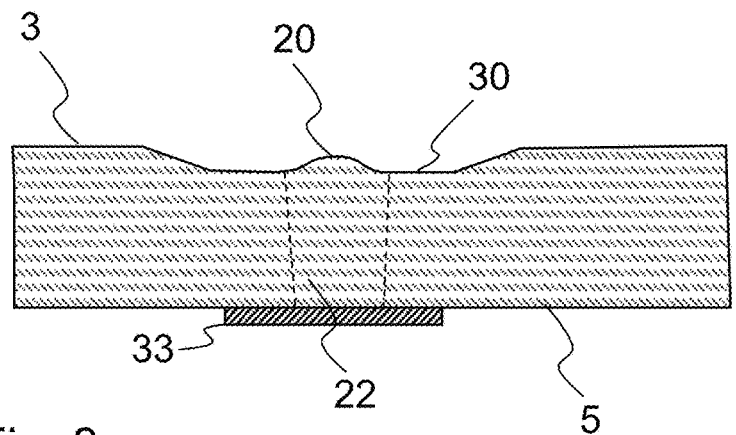
FIG. 8 shows a modification of the embodiment of FIG. 2.

FIG. 8 shows a modification of the embodiment of FIG. 2. In this modification, a depression 30 is provided in the surface of the glass or glass ceramic element on face 3. In this depression, a local elevation 20 was then produced using the method of the invention. The depression may be produced for instance by hot molding before ceramization, or by an abrasive process before or after ceramization. A preferred application are control elements, in particular on a glass ceramic cooktop, which are marked by a depression 30. Such depressed or concave control elements are used to make the control element or its position haptically detectable. The local elevation may add an additional haptic feature. In particular, such a local elevation may even replace a printed feature indicating the function of the control element. This offers the advantage that the local elevation, in particular in form of a symbol in this case, is more resistant against abrasion compared to a printed feature. Preferably, a touch-sensitive switch is used for the control element. For this purpose, a suitable sensor 33 may be arranged below the depression, for example, which detects the touch of a finger in the depression on the glass ceramic. A capacitive sensor is suitable for this purpose, for example. An appropriate sensor could also be arranged on the surface of depression 30, to create a touch-sensitive switch.

Figure 9:
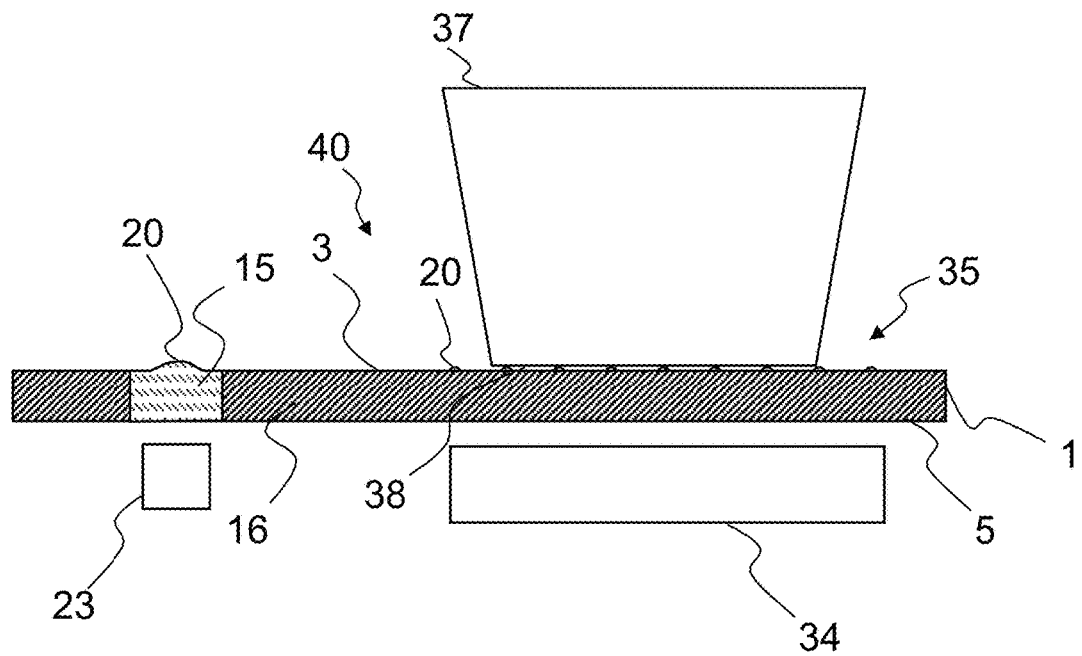
FIG. 9 shows a glass ceramic cooktop.

FIG. 9 shows, as an application of the invention, a glass ceramic cooktop 40 with a glass ceramic plate 1 which comprises at least one local elevation 20 produced according to the invention. One embodiment of the invention exploits the fact that in volume-colored glass ceramics an increase in transmission may be achieved at the same time with the creation of an elevation 20. Thereby, display elements, in particular self-luminous display elements, below the glass ceramic plate may become visible. Accordingly, one embodiment of the invention therefore contemplates that the glass ceramic plate 1 is volume-colored by coloring metal ions, and that in the region of the local elevation or elevation 20 the coloring of the glass ceramic is different from that of a second region 16 adjacent to local elevation 20, so that in the region of local elevation 20 the absorption coefficient is lower than the absorption coefficient of the second region 16 so that in the visible spectral range integral light transmission of local elevation 20 is higher than integral light transmission of the second region 16. A preferably self-luminous display device 23 is arranged below the first region 15, which emits light that is visible through the first region 15.

According to another embodiment, elevation 20 is produced prior to ceramization. Brightening in the region of the elevation is then created in a second heat treatment step in which the above-mentioned de-colorization is achieved.

Such a display may in particular be combined with a control element according to FIG. 8, so that self-luminous touch-sensitive switches with haptically perceptible local elevations 20 are created.

Local elevations 20 may moreover be used in a particularly advantageous way to reduce thermal conduction between a cooking vessel 37 and the glass ceramic surface. This is for example advantageous if an induction heating element is used as a heating element 34. In this case, the cooking vessel becomes hotter than the glass ceramic plate. Therefore, according to one embodiment of the invention it is contemplated, that the glass ceramic cooktop 40 comprises a cooking zone 35 with local elevations 20, so that due to the local elevations a contact area of the cooking vessel 37 placed on the cooking zone is reduced and an air gap 38 is provided between the bottom of cooking vessel 37 and the surface of the glass ceramic plate 1.

The raised features or local elevations 20 produced according to the invention generally have a special and advantageous shape which is only apparent to a limited extent in the example of FIG. 7, because of the somewhat imprecise measurement and the small measuring scope.

Figure 10:
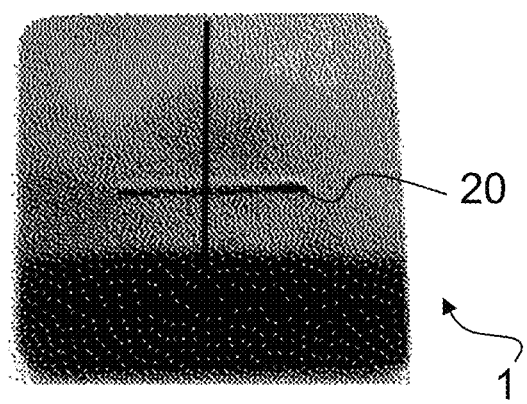
FIG. 10 is a photograph of a glass ceramic element with a local elevation.

FIG. 10 shows a photograph of a glass ceramic element 1 according to the invention with a local elevation 20, here in the form of a straight line-shaped elevation.

Figure 11:
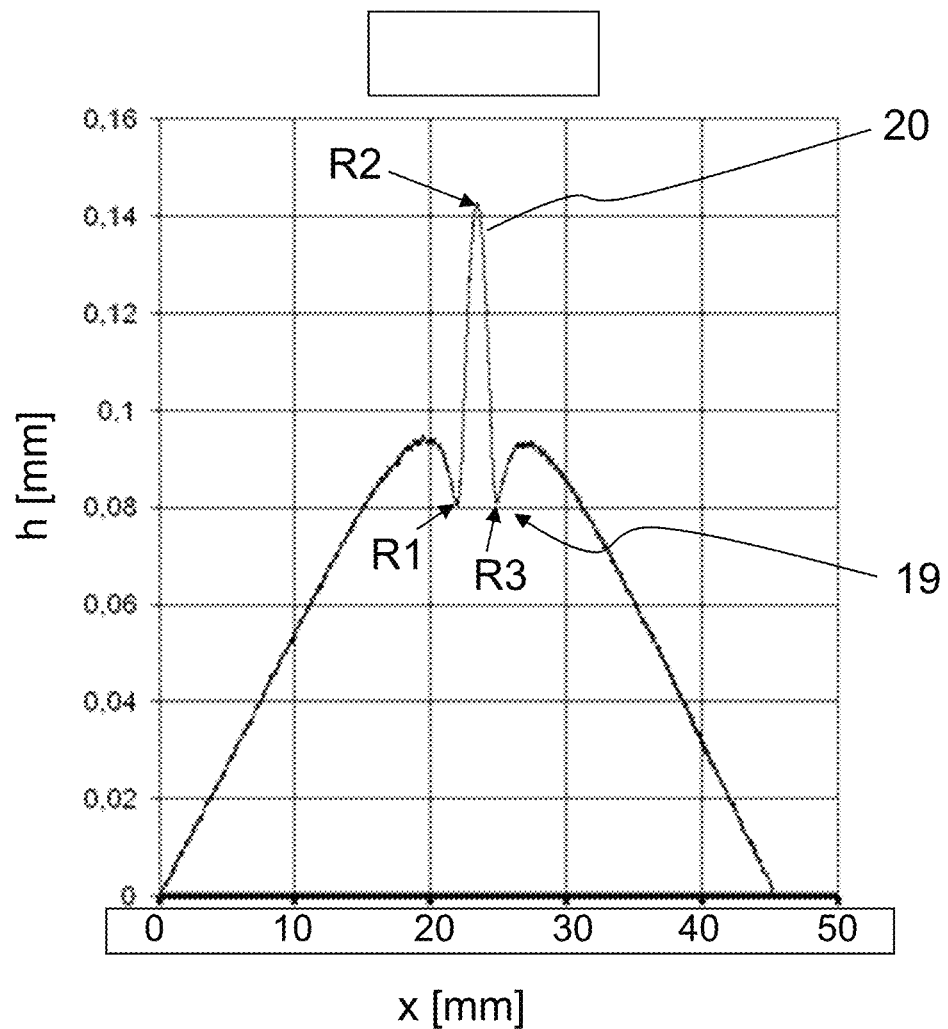
FIG. 11 is a contour scan along a path across the local elevation of the feature shown in FIG. 10.

FIG. 11 shows a contour scan of the surface, or a surface profile, which was measured by means of a measuring probe along the arrow shown in FIG. 10. The total measuring distance was 45 mm. The glass ceramic sample shows a slight curvature, so that the measured height values of the surface profile of FIG. 11 rise towards the center of the sample. The contour scan was measured using a profilometer with a stylus tip.

The surface profile clearly indicates that elevation 20 merges into a depressed periphery 19. Without being limited to the specific example illustrated, according to another aspect of the invention a glass ceramic article 1 is contemplated, which comprises at least one local elevation 20 on the surface, wherein a smallest lateral dimension thereof has a length of at least 0.05 mm and the local elevation has a height in a range from 0.025 to 0.8 millimeters, wherein the elevation and the surrounding glass ceramic material are monolithic and have the same composition, and wherein elevation 20 is surrounded by a depressed periphery 19. In other words, elevation 20 merges into a trench that is depressed with respect to the surface of the glass ceramic element. Furthermore, the volumes of depressed periphery 19 and of elevation 20 may almost or completely even out one another. Without being limited to the exemplary embodiment, according to one embodiment of the invention it is therefore contemplated, that the volumes of local elevation 20 and of depressed periphery 19 differ by not more than a factor of 2, preferably by not more than a factor of 1.5.

Therefore, in total, no or only a small increase in volume is necessary and accordingly no or only a small decrease in density is resulting in the region of elevation 20. Therefore, mechanical stresses remain small. This is true in particular if the deformation in form of a local elevation 20 is created in a glass element and the glass element is ceramized thereafter. During ceramization, remaining mechanical stresses can be relieved completely or at least almost completely. Therefore, according to a preferred embodiment of the invention, in the region of local elevation 20 glass ceramic element 1 exhibits mechanical stresses of less than absolute 15 MPa, preferably less than absolute 10 MPa.

The terms "protrusion" or synonymously "elevation", and "depression" as used in this specification are meant relative to the level of the surface of the glass or glass ceramic element surrounding the elevation or depression.

Furthermore, as can also be seen from FIG. 11, the minimum radii of curvature of the depression and the elevation are typically similar. However, according to one embodiment of the invention, the minimum radius of curvature of elevation 20 is greater than the minimum radius of curvature of depression 19.

According to one embodiment of the invention, the minimum radius of curvature of elevation 20 and the minimum radius of curvature of depression 19 differ by not more than a factor of 3.5, preferably by not more than a factor of 2.5. In particular, the minimum radius of curvature of elevation 20 is located at a convex curvature and the minimum radius of curvature of depression 19 is located at a concave curvature of the surface. Typical minimum radii of curvature of elevations 20 produced according to the invention are between 0.5 and 10 millimeters, preferably between 1.5 millimeters and 8 millimeters.

In FIG. 11, the lateral positions of the trenches of depressed periphery 19 with the two minimum radii of curvature R1, R3 and the minimum radius of curvature R2 of elevation 20 are indicated by way of example.

Generally, the local curvature radii can be determined from the measured values of a contour scan using a 3-point method. For this purpose, vectors $$\vec{a} = \overrightarrow{BC} = \begin{pmatrix} C_x - B_x \\ C_y - B_y \\ C_z - B_z \end{pmatrix}, \tag{1}$$

$$\vec{b} = \overrightarrow{CA} = \begin{pmatrix} A_x - C_x \\ A_y - C_y \\ A_z - C_z \end{pmatrix},$$

$$\vec{c} = \overrightarrow{AB} = \begin{pmatrix} B_x - A_x \\ B_y - A_y \\ B_z - A_z \end{pmatrix}$$

are determined, which represent connecting vectors between three points A, B, C of the contour or surface profile. In the notation given above, contour points A, B, C each have three coordinates. However, the method may as well be applied to a two-dimensional contour scan as shown in FIG. 11 by way of example, for example by setting z-coordinates $A_z$, $B_z$, $C_z$ to zero.

With the vectors according to equations (1) it is then possible to determine quantities $$s = \frac{1}{2} * (|\vec{a}| + |\vec{b}| + |\vec{c}|) \text{ and} \tag{2}$$

$$A = \sqrt{s * (s - |\vec{a}|) * (s - |\vec{b}|) * (s - |\vec{c}|)} \tag{3}$$

from the absolute values of the vectors. The radius of curvature then results as the radius of a circle passing through points A, B, C $$r = \frac{(|\vec{a}| * |\vec{b}| * |\vec{c}|)}{4A}.$$

To obtain a more accurate value for the radius of curvature, it is furthermore possible to average the radii of curvature of several triples of different points A, B, C.

For the example shown in FIG. 11 the resulting radii of curvature are: R1=6.47 mm; R2=11.58 mm; and R3=6.18 mm.

Although the minimum radius of curvature R2 of elevation 20 is greater than the minimum radii of curvature of the trenches, or of depressed periphery 19, all radii are in the same order of magnitude and the radii differ by less than a factor of 2.

Figure 12:
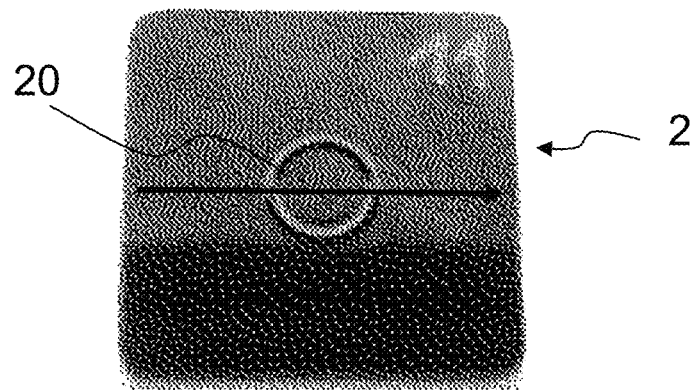
FIG. 12 is a photograph of a glass element with an annular local elevation.
Figure 13:
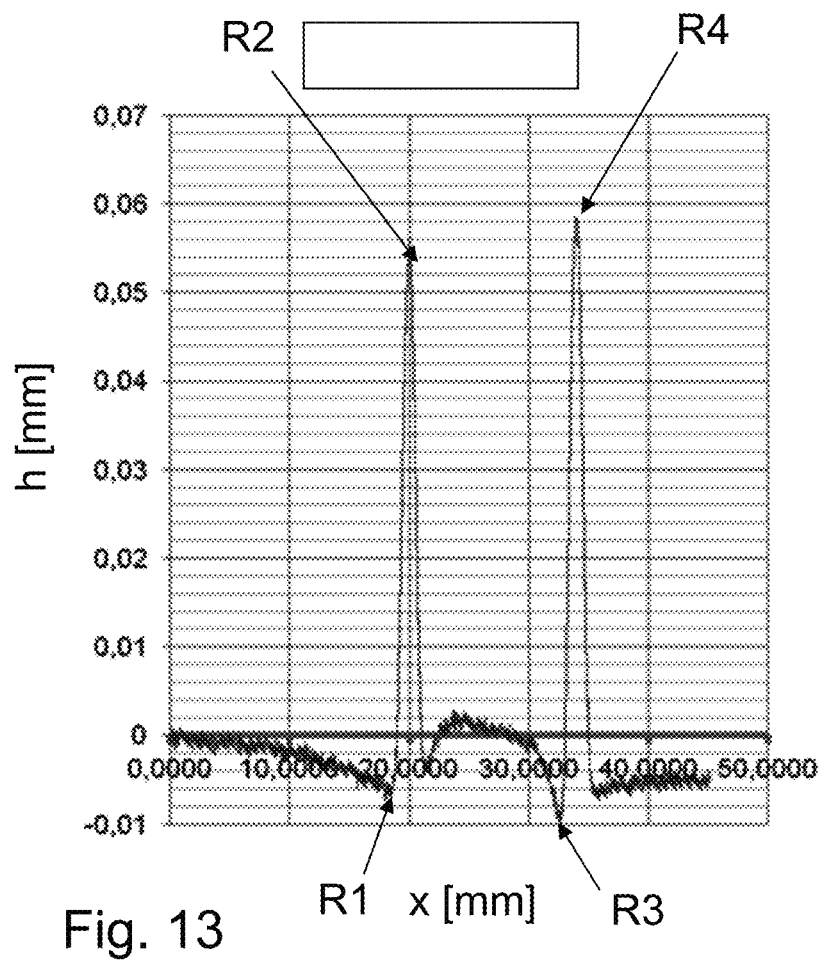
FIG. 13 is a contour scan of the glass element shown in FIG. 12 along a path across the local elevation.

FIG. 12 and FIG. 13 show another example of an elevation 20 according to the invention which merges into the surrounding surface through a depressed periphery 19 or trench-shaped depression. In this example, the surface of a glass element 2 was formed with a ring-shaped elevation 20. Glass element 2 may be subsequently ceramized to obtain a glass ceramic element. FIG. 13 shows a contour scan along a path crossing the center of the ring-shaped elevation 20, similar to FIG. 11. This path is indicated as an arrow in the photograph of FIG. 12. The contour scan crosses elevation 20 twice, at diametrically opposed points with respect to the center of the ring-shaped elevation. Accordingly, the contour scan shows two maxima. The method discussed above was again used to determine the minimum radii of curvature of the depressed periphery (radii R1, R3) and of elevation 20 (radii R2, R4) from the contour scan. The resulting radii in this example are: R1=8.8 mm; R2=6.1 mm; R3=6.2 mm; and R4=5.7 mm.

Here, the minimum radii of curvature of depressed periphery 19 and elevation 20 differ only slightly. According to the measured values the difference is smaller than a factor of 1.5.

In both exemplary embodiments, elevation 20 has the shape of a line, once in the form of a straight line and once ring-shaped as a circular line. Generally, line-shaped elevations 20 are particularly preferred for indicating for instance control elements, or, more generally, zones on a glass ceramic element. In a glass ceramic cooktop such as the one shown in FIG. 9, for example, a display element or a sensor could be provided, in particular a sensor for a control panel switch. In this example, the elevation 20 of the invention additionally functions as heat insulation. For example, the contact of a hot cooking vessel with the glass ceramic material is avoided in a region of the sensor or the display, so that the glass ceramic heats up more slowly. Thus, a display device 23 or a sensor is protected from overheating and the insulated area remains cool enough to be touched by fingers.

Depressed periphery 19 provides particular advantages. The height difference between the lowest point of depressed periphery 19 and the highest point of elevation 20 is increased by the depth of the periphery. Thus, elevation 20 becomes haptically and visually more clearly perceptible than an elevation of the same height rising from a flat surface. Furthermore, the risk of damage to the elevation, for example by a cooking vessel sliding over the cooktop, is avoided.

As apparent from the examples, the depressed periphery 19 typically has another feature that is particularly advantageous for visual and haptic perceptibility. Namely, depressed periphery 19 initially declines gently from the flat surface areas towards elevation 20, then merging more steeply into elevation 20 starting from the lowest point. Furthermore, because of the different steepness of the slopes of depressed periphery 19, the lowest point of the depressed periphery is offset in the direction towards the elevation. In other words, in one embodiment of the invention, depressed periphery 19 has an asymmetrical cross-sectional shape with respect to its lowest point, with an average slope starting from the lowest point towards elevation 20 having a larger absolute value than that of the slope starting from the lowest point away from elevation 20. In other words, depressed periphery 19 has two slopes starting from the lowest point, and the slope towards the elevation is steeper than the other slope. Generally, the lowest point is also the point with the minimum radius of curvature, or the point with the minimum radius of curvature is located at least close to the lowest point. This shape also results in improved visibility and perceptibility, since the decline of the surface to the lowest point occurs more gently and thus less noticeable, whereby the elevation becomes more clearly discernible and visible.

Figure 14:
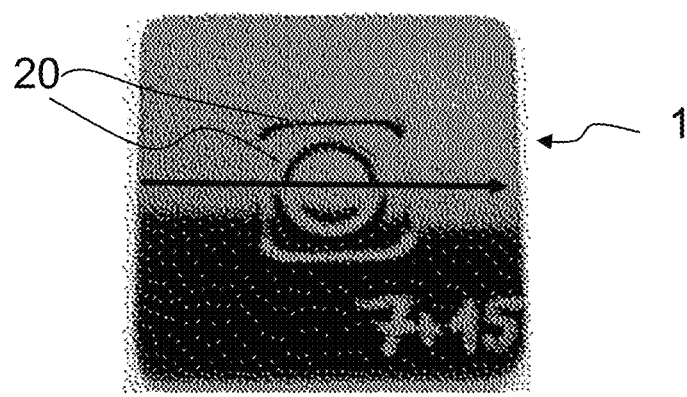
FIG. 14 is a photograph of a glass ceramic element with two nested annular elevations.
Figure 15:
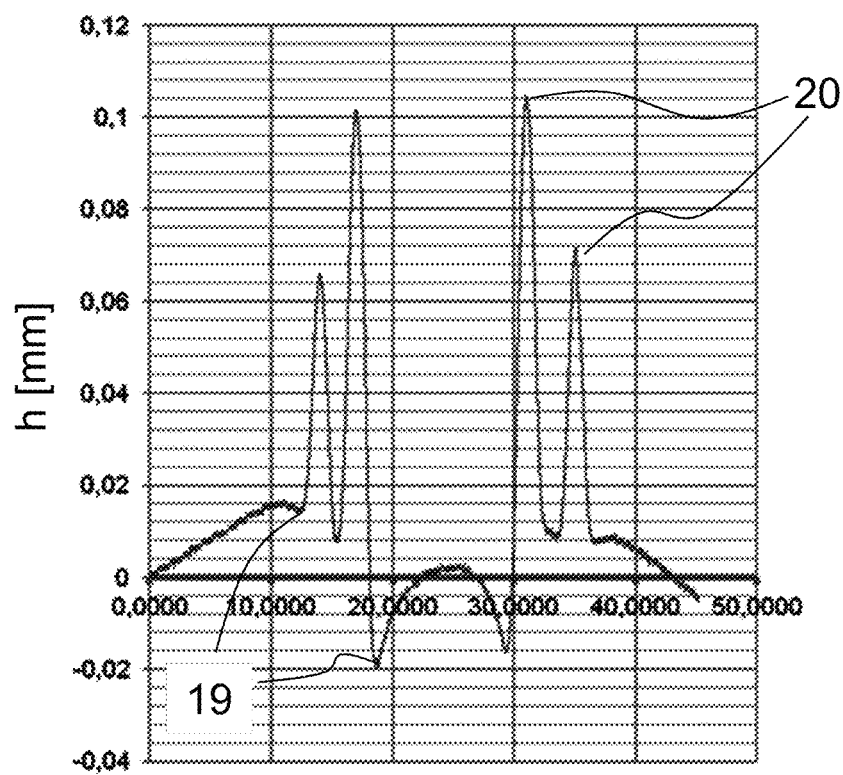
FIG. 15 is a contour scan of the glass ceramic element shown in FIG. 14.

The invention allows to produce almost any shape of elevations 20 with respect to the surface profile thereof. FIGS. 14 and 15 show another example. Ring-shaped elevations may be nested in one another, as in the example shown. In the example, an inner circular elevation 20 was produced inside an outer ring-shaped elevation 20 with a square or more generally angular contour, in a glass element, and then the glass element was ceramized into a glass ceramic element. As in the example shown, the individual rings of nested ring-shaped elevations 20 may have different heights. It is advantageous if, as shown in the example, the height increases toward the center, or if inner rings have a larger height than outer rings. In case of a glass ceramic cooktop, for example, this facilitates sliding of a cooking vessel over the deformation.

If electromagnetic radiation, preferably laser light, which penetrates the glass or glass ceramic is used for heating to produce the elevation, heating of the entire volume between entry and exit point will be caused. This applies even more if a support is used which reflects the radiation. In this way, opposite elevations 20 may be produced in a plate-shaped glass or glass ceramic element, since the two opposite surfaces are heated.

Figure 16:
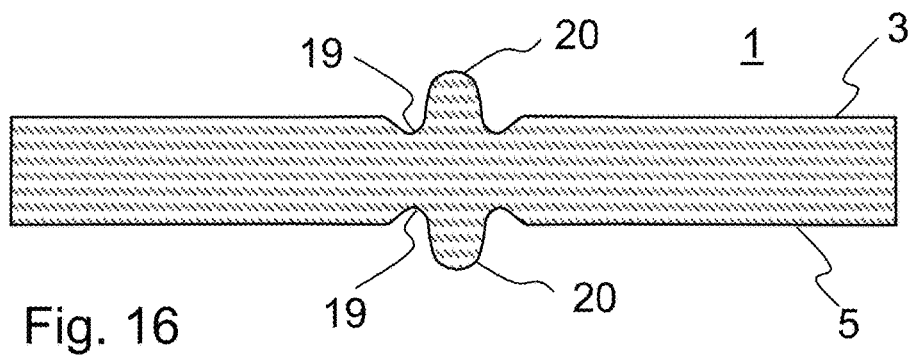
FIG. 16 shows a variation of the example shown in FIG. 2, with opposite elevations.

As an example, FIG. 16 schematically shows a corresponding plate-shaped glass ceramic element 1 with opposite elevations 20 on the two faces 3, 5.

Figure 17:
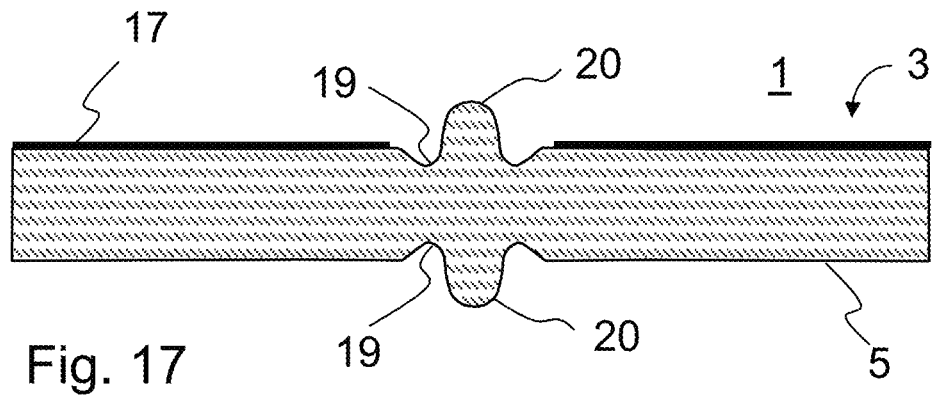
FIG. 17 schematically shows a further embodiment of the example shown in FIG. 2, with opposite elevations and with a coating on one surface.

FIG. 17 schematically shows the plate-shaped glass ceramic element 1 of FIG. 16, with opposite elevations 20 on the two faces 3, 5, and with a layer 17 one face 3. Due to the shape of the created elevation 20 which is characterized by smooth transitions of the radii, a low absolute height of the elevation and a small lateral extent, a screen-printing blade can be used which is moved over the elevations. Therefore, it is possible to apply a layer 17 on glass ceramic element 1 by a screen-printing process which is particularly cost-efficient, once the elevation 20 has been produced. In this way, a layer may be applied close to the beginning deformation. Thus, standard decoration methods such as screen-printing can be used particularly advantageously to apply a layer 17 which in particular may be a decorative layer.

In this way, layers, especially decorative layers which are layers that create a specific visual appearance, or functional layers, such as scratch protection layers or antiadhesive layers may be applied to glass ceramic element 1 after the elevations have been produced according to the invention. Subsequent application of the layer has the advantage that the layer cannot be damaged when the elevations are produced. This allows to apply even very sensitive layers.

Figure 18:
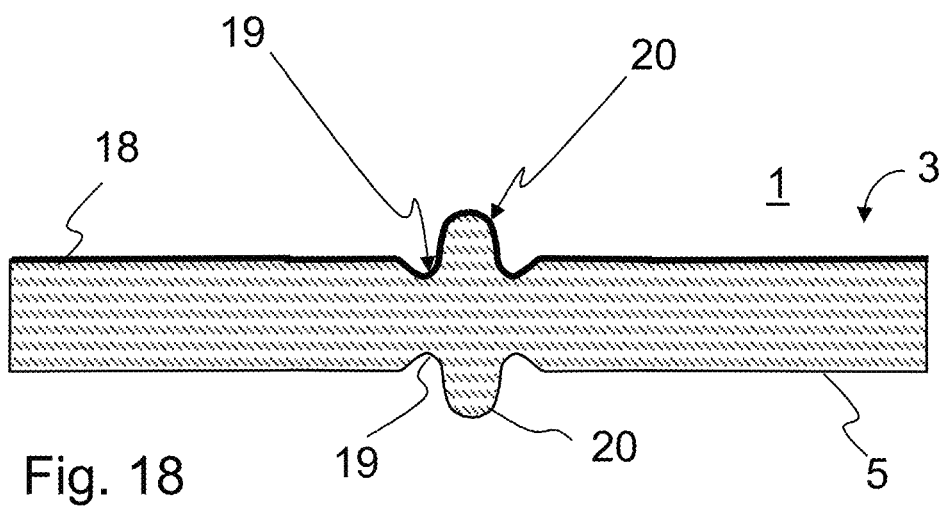
FIG. 18 schematically shows a further embodiment of the example shown in FIG. 2, with opposite elevations, and with a coating on one surface including on the elevation.

FIG. 18 schematically shows another exemplary embodiment of a plate-shaped glass ceramic element 1 with opposite elevations 20 on the two faces 3, 5, wherein one face 3 is provided with a layer 18. In this example, the layer applied to face 3 also covers the region of elevation 20 and the region of depressed periphery 19. The shape of the elevation allows to print on the periphery and on the elevation, so that face 3 can be completely provided with a layer. In this way it was readily possible to produce decorative features or full surface print patterns of a thickness of up to about 0.1 mm on the glass ceramic element, after the latter had been provided with the desired elevation.

Face 3 preferably is the utilization side of glass ceramic element 1.

Instead of applying the layer after the elevation has been produced, a layer may as well be applied before this process step. In other words, it is also possible to provide an elevation according to the invention on a glass ceramic element 1 that is already coated, at least partially. In this case, care has to be taken that the heat-affected zone is free of the layer or coating, as the heat might cause damage to the layer. Since according to the invention the heat-affected zone can be kept very small, advantageously, only correspondingly small areas on the surface of glass ceramic element 1 need to be excluded from the layer. Generally, the extent of the heat-affected zone corresponds to that region which is exposed to the electromagnetic radiation, which is a punctiform area on the surface of the glass element or glass ceramic element.

The distance between the layer and the laser spot generally depends on the temperature resistance of the layer, and care has to be taken to not overheat the layer. For this purpose, not only the pre-heating temperature of the glass or the glass ceramic needs to be considered, but also the temperature increased by thermal conduction in the vicinity of the reshaped region that is directly heated. In the case of decorative coatings, for example ceramic decorative inks which are applied before reshaping, these temperatures are not particularly critical, such coatings can withstand temperatures of up to 900° C. If, however, other layers exist, such as scratch protection layers, underside layers for covering scattered light, anti-reflective, reflective, or IR reflective coatings, these are often less temperature resistant. Accordingly, greater caution should be exercised and an appropriately larger distance should be chosen.

Elevations 20 may have a punctiform shape or may be line-shaped. In case of punctiform elevations, the dimensions of elevations 20 may reach diameters of 0.05 mm and more, preferably from 0.5 mm to 3 mm, and in case of line-shaped elevations a line width of 0.05 mm and more, preferably from 0.5 mm to 3 mm, with any length of the line.

Figure 19:
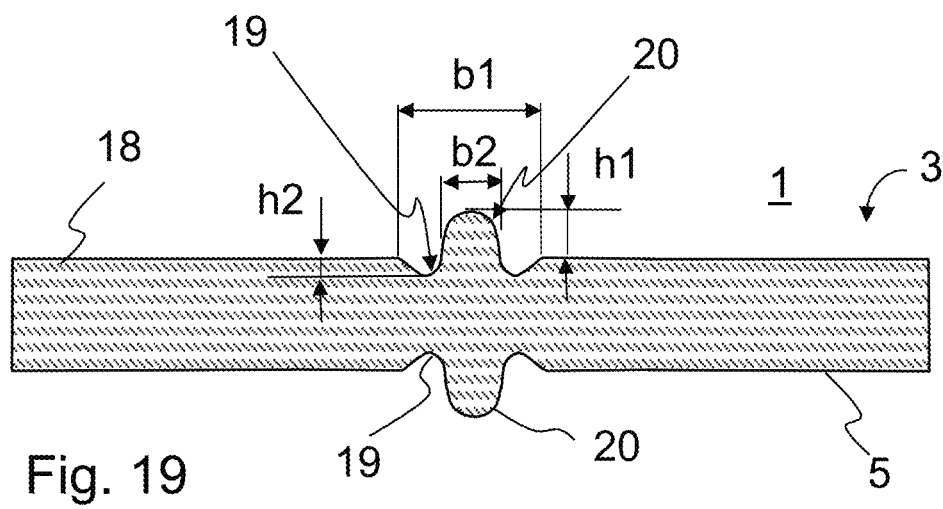
FIG. 19 schematically illustrates an embodiment comprising an elevation with favorable geometric dimensions.

FIG. 19 finally schematically illustrates an embodiment comprising an elevation, with favorable dimensions of width and height of the elevation, which have favorable geometric aspect ratios for a smooth geometric course of the elevation.

It has been found particularly advantageous, if the ratio of the height h1 of an elevation to the total width b1, which includes the width of the elevation b2 and the width of possible depressions around the elevation, is in a range of less than 0.2, preferably less than 0.1. Furthermore it is advantageous, if the ratio of the depth h2 of a depression surrounding the elevation to the height h1 of the elevation is less than 0.5. Finally it is advantageous, if the ratio of the width of the elevation b2 to the total width b1 is between 0.1 and 1. Accordingly, the following relationships are favorable: $h1/b1<0.2$; more preferably $h1/b1<0.1$; $h2/h1<0.5$; and $1>b2/b1>0.1$.

The height and depth are measured starting from the respective surface of the glass or glass ceramic element in each case.

The width b1 depends on the diameter of the laser spot. Therefore, favorable geometric relationships for the formation of a smooth geometric profile with smooth radii transitions are dependent on the size of the laser spot on the surface of the glass or glass ceramic element.

In this way, glass ceramic articles can be produced, which comprise both a layer and local elevations on the same surface. This allows to design specific areas on the surface of the glass ceramic article so as to be visually and haptically perceptible, for example when the article is used as a cooktop, for example control areas or cooking zones.

LIST OF REFERENCE NUMERALS

| | |
|---|---|
| 1 | Glass ceramic element |
| 2 | Glass element |
| 3, 5 | Faces of 1, 2 |
| 7 | Silicon oxide ceramic support |
| 8 | Heating source |
| 9 | Laser source |
| 11 | Fiber |
| 13 | Laser scanner |
| 15 | Brightened region |
| 16 | Non-brightened region adjacent to 15 |
| 17 | Layer |
| 18 | Layer |
| 19 | Depressed periphery, trench |
| 20 | Local elevation, protuberance |
| 22 | Region of reduced density |
| 23 | Display device |
| 24 | Concave curvature |
| 25 | Convex curvature |
| 30 | Depression |
| 33 | Sensor |
| 34 | Heating element |
| 35 | Cooking zone |
| 37 | Cooking vessel |
| 38 | Air gap |
| 40 | Glass ceramic cooktop |
| 90 | Laser beam |
| 130 | Focusing optics |
| 151 | Spectral transmittance of a laser-treated region 15 of 1 |
| 161 | Spectral transmittance of an adjacent non-treated region 16 of 1 |

What is claimed is:

1. A glass ceramic article, comprising:
   a thickness of glass ceramic material;
   a flat surface having at least one local elevation relative to the flat surface and a depression relative to the flat surface, the at least one local elevation being arranged within and merging into the depression; and
   a layer screen printed on the surface, the at least one local elevation having a smallest lateral dimension with a length of at least 0.05 mm, and the at least one local elevation having a height in a range from 0.5% to 20% of the thickness, wherein the at least one local elevation, the depression, and the glass ceramic material are monolithic and have a common composition.

2. The glass ceramic article as claimed in claim 1, wherein the depression area is a depressed periphery, and wherein the at least one local elevation is surrounded by the depressed periphery.

3. The glass ceramic article as claimed in claim 2, further comprising a minimum radius of curvature of the at least one local elevation and a minimum radius of curvature of the depressed periphery differ by not more than a factor of 3.5.

4. The glass ceramic article as claimed in claim 2, further comprising a minimum radius of curvature of the at least one local elevation that is between 0.5 and 10 millimeters.

5. The glass ceramic article as claimed in claim 2, wherein the at least one local elevation and the depressed periphery have volumes that differ by not more than a factor of 2.

6. The glass ceramic article as claimed in claim 2, wherein the depressed periphery has an asymmetrical cross-sectional shape with respect to a lowest point, with an average slope starting from the lowest point towards the at least one local elevation having a larger absolute value than that of a slope starting from a lowest point away from the at least one local elevation.

7. The glass ceramic article as claimed in claim 1, wherein the at least one local elevation has a concave curvature merging into a convex curvature of the depression.

8. The glass ceramic article as claimed in claim 1, wherein the glass ceramic material comprises high quartz mixed crystal as a main crystal phase, and wherein in the at least one local elevation has a higher proportion of keatite mixed crystal as compared to regions of the glass ceramic surrounding the at least one local elevation.

9. The glass ceramic article as claimed in claim 1, wherein the glass ceramic material is volume-colored by coloring metal ions, wherein, in the region of the at least one local elevation, the glass ceramic material has a coloring that is different from that of a second region adjacent to the at least one local elevation so that in the region of the at least one local elevation an absorption coefficient is smaller than an absorption coefficient of the second region so that integral light transmission in the visible spectral range of the at least one local elevation is higher than integral light transmission of the second region.

10. The glass ceramic article as claimed in claim 9, wherein the integral light transmission of the second region is not more than 5%.

11. The glass ceramic article as claimed in claim 9, wherein the integral light transmission has a transmittance profile with a full width at half maximum that is greater than a full width at half maximum of the at least one local elevation.

12. The glass ceramic article as claimed in claim 9, wherein the at least one local elevation has a light scattering in the glass ceramic material that is increased by not more than 20 percentage points as compared to light scattering in the second region.

13. The glass ceramic article as claimed in claim 1, wherein the glass ceramic material comprises aluminosilicate glass ceramic and wherein the glass ceramic material of the at least one local elevation has a higher content of keatite mixed crystal than a second region adjacent to the at least one local elevation.

14. A glass ceramic cooktop comprising a glass ceramic article as claimed in claim 1 in the form of a glass ceramic plate.

15. A glass ceramic cooktop comprising a glass ceramic article as claimed in claim 9, further comprising a self-luminous display device is arranged below the region and emitting light that is visible through the region.

16. The glass ceramic cooktop as claimed in claim 14, wherein the at least one local elevation comprises a cooking vessel contact area.

17. A glass ceramic article, comprising:
a glass ceramic material having a thickness and a flat surface;
at least one local elevation relative to the flat surface;
a depression that is depressed relative to the flat surface, the at least one local elevation being arranged within and merging into the depression; and
a layer on the surface, the at least one local elevation having a smallest lateral dimension with a length of at least 0.05 mm, and the at least one local elevation having a height in a range from 0.5% to 20% of the thickness, wherein the at least one local elevation, the depression, and the glass ceramic material are monolithic and have a common composition, and wherein the glass ceramic material below the at least one local elevation has a lower density than material surrounding the at least one local elevation.

18. A glass ceramic article comprising a glass ceramic material having a flat surface, a depression that is depressed relative to the flat surface, and at least one local elevation relative to the flat surface, the at least one local elevation being arranged within and merging into the depression, wherein the at least one local elevation, the depression, and the glass ceramic material are monolithic and have a common composition, and wherein the glass ceramic material below the at least one local elevation has a lower density than material surrounding the at least one local elevation.

19. The glass ceramic article as claimed in claim 18, wherein the at least one local elevation has a smallest lateral dimension with a length of at least 0.05 mm and a height in a range from 0.5% to 20% of a thickness of the glass ceramic material.

20. The glass ceramic article as claimed in claim 18, further comprising a layer on the surface except at the at least one local elevation, wherein the layer is on the surface prior to formation of the at least one local elevation.

* * * * *